United States Patent
Hosseini et al.

(10) Patent No.: US 11,464,004 B2
(45) Date of Patent: Oct. 4, 2022

(54) RELAXED CONTROL CHANNEL ELEMENT AND BLIND DECODING OVERBOOKING AND DROPPING FOR NEW RADIO ULTRA-RELIABLE LOW-LATENCY COMMUNICATIONS

(71) Applicant: QUALCOMM Incorporated, San Diego, CA (US)

(72) Inventors: Seyedkianoush Hosseini, San Diego, CA (US); Peter Gaal, San Diego, CA (US); Aamod Khandekar, San Diego, CA (US); James Beckman, La Jolla, CA (US); Afshin Shiravi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/090,657

(22) Filed: Nov. 5, 2020

(65) Prior Publication Data

US 2021/0144687 A1    May 13, 2021

Related U.S. Application Data

(60) Provisional application No. 62/977,106, filed on Feb. 14, 2020, provisional application No. 62/933,351, filed on Nov. 8, 2019.

(51) Int. Cl.
*H04W 72/04* (2009.01)
*H04L 1/00* (2006.01)

(52) U.S. Cl.
CPC ......... *H04W 72/042* (2013.01); *H04L 1/0038* (2013.01)

(58) Field of Classification Search
CPC ........................... H04W 72/042; H04L 1/0038
See application file for complete search history.

(56) References Cited

U.S. PATENT DOCUMENTS

2019/0268206 A1    8/2019    Yang et al.

OTHER PUBLICATIONS

Huawei, et al., "Discussion on PDCCH Monitoring Capability", 3GPP TSG RAN WG1 Meeting #97, 3GPP Draft, R1-1907546, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), 6 Pages, XP051728979, Retrieved from the Internet: URL: http://www.3gpp.org/ftp/Meetings%5F3GPP%5FSYNC/RAN1/Docs/R1%2D1907546%2Ezip [retrieved on May 13, 2019] the whole document, Section 2.1 Enhancement on PDCCH Monitoring Capacity.

(Continued)

*Primary Examiner* — Ronald B Abelson
(74) *Attorney, Agent, or Firm* — Qualcomm Incorporated

(57) ABSTRACT

Methods, systems, and devices for wireless communication are described. Generally, the described techniques provide for efficiently limiting a number of blind decoding attempts or control channel elements (CCEs) that a user equipment (UE) is configured to monitor to limit complexity at the UE. When a UE is configured to use blind decoding for monitoring CCEs in multiple spans in a slot for control information from a base station, the UE may be configured to perform dropping of blind decoding candidates or CCEs in a first temporal span in the slot. In other words, the UE may identify a dropping rule to drop CCE monitoring occasions or blind decoding attempts in excess of a maximum number of non-overlapping CCEs per span or a maximum number of blind decoding attempts per span, respectively, and the UE may apply the dropping rule to the first temporal span within the slot.

46 Claims, 13 Drawing Sheets

(56) References Cited

OTHER PUBLICATIONS

International Search Report and Written Opinion—PCT/US2020/059395—ISA/EPO—dated Feb. 24, 2021.
ZTE: "On PDCCH Enhancements for NR URLLC", 3GPP Draft, R1-1908235, 3GPP TSG RAN WG1 #98, On PDCCH Enhancements for NR URLLC, 3RD Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051764849, 18 Pages, Retrieved from the Internet: URL: http://www.3gpp.org/ftp/tsg_ran/WG1_RL1/TSGR1_98/Docs/R1-1908235.zip [retrieved on Aug. 17, 2019] Section 3. PDCCH Monitoring Capability.
Huawei., et al., "PDCCH Enhancements for URLLC", R1-1908051,3GPP TSG RAN WG1 Meeting #98, Prague, Czech Republic, Aug. 26-30, 2019, 13 pages.
Intel Corporation: "Downlink Control Enhancements for eURLLC", R1-1908645, 3GPP TSG RAN WG1 #98, Prague, CZ, Aug. 26-30, 2019, pp. 1-16.

RELAXED CONTROL CHANNEL ELEMENT AND BLIND DECODING OVERBOOKING AND DROPPING FOR NEW RADIO ULTRA-RELIABLE LOW-LATENCY COMMUNICATIONS

CROSS REFERENCE

The present Application for Patent claims the benefit of U.S. Provisional Patent Application No. 62/933,351 by HOSSEINI et al., entitled "RELAXED CONTROL CHANNEL ELEMENT AND BLIND DECODING OVERBOOKING AND DROPPING FOR NEW RADIO ULTRA-RELIABLE LOW-LATENCY COMMUNICATIONS," filed Nov. 8, 2019, and the benefit of U.S. Provisional Patent Application No. 62/977,106 by HOSSEINI et al., entitled "RELAXED CONTROL CHANNEL ELEMENT AND BLIND DECODING OVERBOOKING AND DROPPING FOR NEW RADIO ULTRA-RELIABLE LOW-LATENCY COMMUNICATIONS," filed Feb. 14, 2020. All of said applications are assigned to the assignee hereof, and are expressly incorporated by reference herein as if fully set forth below and for all applicable purposes.

BACKGROUND

The following relates generally to wireless communications, including to relaxed control channel element (CCE) and blind decoding overbooking and dropping for New Radio (NR) ultra-reliable low-latency communications (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). In some wireless communications systems, a base station may transmit control information to a UE in a physical downlink control channel (PDCCH), and the UE may be configured to monitor multiple PDCCH candidates for the PDCCH that includes the control information from the base station. In particular, the UE may perform blind decoding on each of the multiple PDCCH candidates to identify the PDCCH with the control information from the base station. Improved techniques for supporting blind decoding may be desirable.

SUMMARY

The described techniques relate to improved methods, systems, devices, and apparatuses that support relaxed control channel element (CCE) and blind decoding overbooking and dropping for New Radio (NR) ultra-reliable low-latency communications (URLLC). Generally, the described techniques provide for efficiently limiting a number of blind decoding attempts or CCEs that a user equipment (UE) is configured to monitor to limit complexity at the UE. When a UE is configured to use blind decoding for monitoring CCEs in multiple spans in a slot for control information from a base station, the UE may be configured to perform dropping of blind decoding candidates or CCEs in a subset of the spans (e.g., instead of in all of the spans). In other words, the UE may identify a dropping rule to drop CCE monitoring occasions or blind decoding attempts in excess of a maximum number of non-overlapping CCEs per span or a maximum number of blind decoding attempts per span, respectively, and the UE may apply the dropping rule to fewer than all of the spans within the slot. In some implementations, for example, the UE may apply the dropping rule to the first span within the slot.

A method of wireless communications at a UE is described. The method may include determining that the UE is configured to use blind decoding for monitoring CCEs in a CORESET in accordance with at least one of a maximum number of blind decoding attempts per span within a slot or a maximum number of non-overlapping CCEs per span within the slot, identifying a dropping rule for the UE to drop CCE monitoring occasions or blind decoding attempts in excess of the maximum number of non-overlapping CCEs per span or the maximum number of blind decoding attempts per span, respectively, and applying the dropping rule to fewer than all spans within the slot.

An apparatus for wireless communications at a UE is described. The apparatus may include a processor, memory coupled with the processor, and instructions stored in the memory. The instructions may be executable by the processor to cause the apparatus to determine that the UE is configured to use blind decoding for monitoring CCEs in a CORESET in accordance with at least one of a maximum number of blind decoding attempts per span within a slot or a maximum number of non-overlapping CCEs per span within the slot, identify a dropping rule for the UE to drop CCE monitoring occasions or blind decoding attempts in excess of the maximum number of non-overlapping CCEs per span or the maximum number of blind decoding attempts per span, respectively, and apply the dropping rule to fewer than all spans within the slot.

Another apparatus for wireless communications at a UE is described. The apparatus may include means for determining that the UE is configured to use blind decoding for monitoring CCEs in a CORESET in accordance with at least one of a maximum number of blind decoding attempts per span within a slot or a maximum number of non-overlapping CCEs per span within the slot, means for identifying a dropping rule for the UE to drop CCE monitoring occasions or blind decoding attempts in excess of the maximum number of non-overlapping CCEs per span or the maximum number of blind decoding attempts per span, respectively, and means for applying the dropping rule to fewer than all spans within the slot.

A non-transitory computer-readable medium storing code for wireless communications at a UE is described. The code may include instructions executable by a processor to determine that the UE is configured to use blind decoding for monitoring CCEs in a CORESET in accordance with at least one of a maximum number of blind decoding attempts per span within a slot or a maximum number of non-overlapping CCEs per span within the slot, identify a dropping rule for the UE to drop CCE monitoring occasions or blind decoding attempts in excess of the maximum number of non-overlapping CCEs per span or the maximum number of blind decoding attempts per span, respectively, and apply the dropping rule to fewer than all spans within the slot.

Some examples of the method, apparatuses, and non-transitory computer-readable medium described herein may further include operations, features, means, or instructions for determining a fixed span within the slot in which the UE may apply the dropping rule. In such examples of the method, apparatuses, and non-transitory computer-readable medium described herein, applying the dropping rule to fewer than all of the spans within the slot may include operations, features, means, or instructions for dropping one or more CCE monitoring occasions or one or more blind decoding attempts for the fixed span. In some examples of the method, apparatuses, and non-transitory computer-readable medium described herein, the fixed span may include a first temporal span within the slot. In some examples of the method, apparatuses, and non-transitory computer-readable medium described herein, the fixed span may include a span in which a common search space (CSS) is present. In some examples of the method, apparatuses, and non-transitory computer-readable medium described herein, applying the dropping rule to fewer than all of the spans within the slot may include operations, features, means, or instructions for dropping one or more CCE monitoring occasions or one or more blind decoding attempts for a number of spans in which a CSS may be present. In some examples of the method, apparatuses, and non-transitory computer-readable medium described herein, applying the dropping rule to fewer than all of the spans within the slot may include operations, features, means, or instructions for dropping one or more CCE monitoring occasions or one or more blind decoding attempts for a number of spans in which a CSS may be present and when the slot may be for communications with either a primary cell (PCell) or a primary-secondary cell (PSCell).

In some examples of the method, apparatuses, and non-transitory computer-readable medium described herein, applying the dropping rule to fewer than all of the spans within the slot may include operations, features, means, or instructions for refraining from applying the dropping rule in a number of spans that do not include a CSS. In some examples of the method, apparatuses, and non-transitory computer-readable medium described herein, applying the dropping rule to fewer than all of the spans within the slot may include operations, features, means, or instructions for refraining from applying the dropping rule to any span within the slot based on the slot not including a CSS.

Some examples of the method, apparatuses, and non-transitory computer-readable medium described herein may further include operations, features, means, or instructions for determining a maximum number of spans in which the UE may apply the dropping rule, where applying the dropping rule to fewer than all of the spans within the slot may be based on the maximum number of spans determined by the UE. In some examples of the method, apparatuses, and non-transitory computer-readable medium described herein, the operations, features, means, or instructions for determining the maximum number of spans may be based on a UE capability. In such examples, some examples of the method, apparatuses, and non-transitory computer-readable medium described herein may further include operations, features, means, or instructions for transmitting the UE capability to a base station, and identifying that a number of spans that include a CSS within the slot may be in accordance with the UE capability.

In some examples of the method, apparatuses, and non-transitory computer-readable medium described herein, the maximum number of spans may be common for different span timing and length configurations for the UE. In some examples of the method, apparatuses, and non-transitory computer-readable medium described herein, the maximum number of spans may be different for different span timing and length configurations for the UE. In some examples of the method, apparatuses, and non-transitory computer-readable medium described herein, determining the maximum number of spans may include operations, features, means, or instructions for determining the maximum number of spans in which the UE may be able to apply the dropping rule based on a physical downlink shared channel (PDSCH) or physical uplink shared channel (PUSCH) minimum processing time capability of a cell with which the UE communicates over the slot.

Some examples of the method, apparatuses, and non-transitory computer-readable medium described herein may further include operations, features, means, or instructions for determining a fixed set of spans within the slot in which the UE may apply the dropping rule. In some examples of the method, apparatuses, and non-transitory computer-readable medium described herein, applying the dropping rule to fewer than all of the spans within the slot may include dropping one or more CCE monitoring occasions or one or more blind decoding attempts for the fixed set of spans. In some examples of the method, apparatuses, and non-transitory computer-readable medium described herein, the fixed set of spans includes a first temporal span within the slot. In some examples of the method, apparatuses, and non-transitory computer-readable medium described herein, the fixed set of spans includes at least one span in which a CSS is present.

A method of wireless communications at a base station is described. The method may include identifying a maximum number of spans per slot in which a UE may apply a dropping rule, where the dropping rule indicates that the UE is to drop CCE monitoring occasions or blind decoding attempts in accordance with the dropping rule, configuring one or more CSSs within spans of a slot for communication with the UE such that a number of spans within the slot that include a CSS is less than or equal to the maximum number of spans per slot, and indicating, to the UE, a CSS configuration in accordance with the configuring.

An apparatus for wireless communications at a base station is described. The apparatus may include a processor, memory coupled with the processor, and instructions stored in the memory. The instructions may be executable by the processor to cause the apparatus to identify a maximum number of spans per slot in which a UE may apply a dropping rule, where the dropping rule indicates that the UE is to drop CCE monitoring occasions or blind decoding attempts in accordance with the dropping rule, configure one or more CSSs within spans of a slot for communication with the UE such that a number of spans within the slot that include a CSS is less than or equal to the maximum number of spans per slot, and indicate, to the UE, a CSS configuration in accordance with the configuring.

Another apparatus for wireless communications at a base station is described. The apparatus may include means for identifying a maximum number of spans per slot in which a UE may apply a dropping rule, where the dropping rule indicates that the UE is to drop CCE monitoring occasions or blind decoding attempts in accordance with the dropping rule, means for configuring one or more CSSs within spans of a slot for communication with the UE such that a number of spans within the slot that include a CSS is less than or equal to the maximum number of spans per slot, and means for indicating, to the UE, a CSS configuration in accordance with the configuring.

A non-transitory computer-readable medium storing code for wireless communications at a base station is described. The code may include instructions executable by a processor to identify a maximum number of spans per slot in which a UE may apply a dropping rule, where the dropping rule indicates that the UE is to drop CCE monitoring occasions or blind decoding attempts in accordance with the dropping rule, configure one or more CSSs within spans of a slot for communication with the UE such that a number of spans within the slot that include a CSS is less than or equal to the maximum number of spans per slot, and indicate, to the UE, a CSS configuration in accordance with the configuring.

In some examples of the method, apparatuses, and non-transitory computer-readable medium described herein, the maximum number of spans may be common for different span timing and length configurations for the UE. In some examples of the method, apparatuses, and non-transitory computer-readable medium described herein, the maximum number of spans may be different for different span timing and length configurations for the UE. In some examples of the method, apparatuses, and non-transitory computer-readable medium described herein, the maximum number of spans may be based on a PDSCH or PUSCH minimum processing time capability of a cell associated with the base station and with which the UE communicates over the slot.

A method of wireless communications at a base station is described. The method may include identifying a fixed span within a slot in which a UE may apply a dropping rule, where the dropping rule indicates that the UE is to drop CCE monitoring occasions or blind decoding attempts in accordance with the dropping rule, configuring one or more CSSs within spans of the slot for communication with the UE such that at least the fixed span within the slot includes a CSS, and indicating, to the UE, a CSS configuration in accordance with the configuring.

An apparatus for wireless communications at a base station is described. The apparatus may include a processor, memory coupled with the processor, and instructions stored in the memory. The instructions may be executable by the processor to cause the apparatus to identify a fixed span within a slot in which a UE may apply a dropping rule, where the dropping rule indicates that the UE is to drop CCE monitoring occasions or blind decoding attempts in accordance with the dropping rule, configure one or more CSSs within spans of the slot for communication with the UE such that at least the fixed span within the slot includes a CSS, and indicate, to the UE, a CSS configuration in accordance with the configuring.

Another apparatus for wireless communications at a base station is described. The apparatus may include means for identifying a fixed span within a slot in which a UE may apply a dropping rule, where the dropping rule indicates that the UE is to drop CCE monitoring occasions or blind decoding attempts in accordance with the dropping rule, means for configuring one or more CSSs within spans of the slot for communication with the UE such that at least the fixed span within the slot includes a CSS, and means for indicating, to the UE, a CSS configuration in accordance with the configuring.

A non-transitory computer-readable medium storing code for wireless communications at a base station is described. The code may include instructions executable by a processor to identify a fixed span within a slot in which a UE may apply a dropping rule, where the dropping rule indicates that the UE is to drop CCE monitoring occasions or blind decoding attempts in accordance with the dropping rule, configure one or more CSSs within spans of the slot for communication with the UE such that at least the fixed span within the slot includes a CSS, and indicate, to the UE, a CSS configuration in accordance with the configuring.

In some examples of the method, apparatuses, and non-transitory computer-readable medium described herein, the fixed span is a first temporal span within the slot. In some examples of the method, apparatuses, and non-transitory computer-readable medium described herein, the CSS is an only CSS configured within the spans of the slot for communication with the UE.

DETAILED DESCRIPTION

Figure 1:
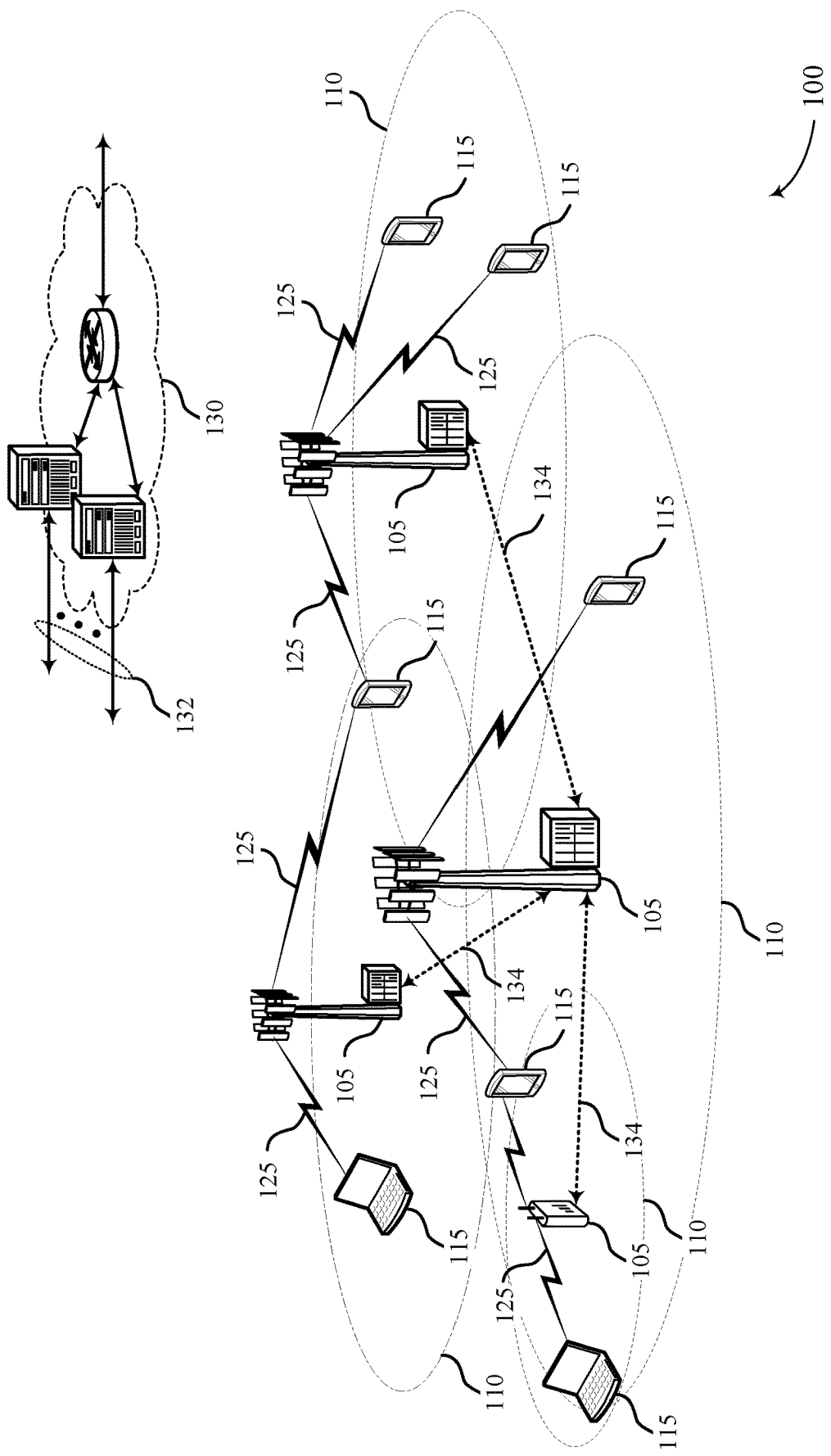
FIG. 1 illustrates an example of a wireless communications system that supports relaxed control channel element (CCE) and blind decoding overbooking and dropping for New Radio (NR) ultra-reliable low-latency communications (URLLC) in accordance with aspects of the present disclosure.

In some wireless communications systems, a base station may transmit control information to a user equipment (UE)

in a physical downlink control channel (PDCCH), and the UE may be configured to monitor multiple PDCCH candidates or control channel elements (CCEs) for the PDCCH that includes the control information from the base station. In particular, the UE may perform blind decoding on each of the multiple PDCCH candidates or CCEs to identify the PDCCH with the control information from the base station. In some cases, to limit complexity, the UE may be configured to drop blind decoding candidates in a slot in excess of a maximum number of blind decoding attempts and drop CCEs in a slot in excess of a maximum number of non-overlapping CCEs. In some cases, however, if the UE is configured to monitor PDCCH candidates in multiple spans within a slot for control information from a base station, the limit on the number of blind decoding candidates and CCEs may be per span instead of per slot. Thus, the UE may be configured to perform blind decoding candidate or CCE counting and dropping multiple times per slot (e.g., in each span in the slot) instead of once per slot (e.g., since there may be multiple spans per slot). As a result, the process of performing dropping may increase complexity at the UE.

As described herein, a wireless communications system may support efficient techniques for limiting a number of blind decoding attempts or CCEs that a UE is configured to monitor to limit complexity at the UE. In particular, when the UE is configured to use blind decoding for monitoring CCEs in multiple spans in a slot for control information from a base station, the UE may be configured to perform dropping of blind decoding candidates or CCEs in a subset of the spans. That is, the UE may identify a dropping rule to drop CCE monitoring occasions or blind decoding attempts in excess of a maximum number of non-overlapping CCEs per span or a maximum number of blind decoding attempts per span, respectively, and the UE may apply the dropping rule to fewer than all of the spans within the slot. For example, the UE may apply the dropping rule to a first span within the slot and refrain from applying the dropping rule, or not expect to apply the dropping rule, to spans outside of the first span within the slot. In some cases, the UE may transmit an indication of a maximum number of spans in which the UE may perform dropping of blind decoding candidates and CCEs, and the base station may configure common search spaces (CSSs) within spans of a slot such that a number of spans within the slot that include a CSS is less than or equal to the maximum number of spans per slot indicated by the UE.

The described techniques may be implemented to realize one or more advantages. In some implementations, for example, the described techniques may define time-domain resources over which a UE may expect to apply a dropping rule for PDCCH monitoring and time-domain resources over which a UE may not expect to apply a dropping rule for PDCCH monitoring. As such, the UE may limit the complexity associated with PDCCH overbooking and dropping, which may enable one or more processing components of the UE related to PDCCH monitoring to enter a sleep mode more frequently or for longer time durations. Further, the described techniques support the application of dropping rules for PDCCH overbooking within time-domain resources at a sub-slot granularity (e.g., per span instead of per slot), which may support low latency downlink communication.

Aspects of the disclosure introduced above are described herein in the context of a wireless communications system. Examples of processes and signaling exchanges that support relaxed CCE and blind decoding overbooking and dropping for New Radio (NR) ultra-reliable low-latency communications (URLLC) are then described. Aspects of the disclosure are further illustrated by and described with reference to apparatus diagrams, system diagrams, and flowcharts that relate to relaxed CCE and blind decoding overbooking and dropping for NR URLLC.

FIG. 1 illustrates an example of a wireless communications system 100 that supports relaxed CCE and blind decoding overbooking and dropping for NR URLLC in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, URLLC, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6, 7, or 14 orthogonal frequency division multiplexing (OFDM) symbols (e.g., depending on the length of the cyclic prefix prepended to each symbol period).

In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In the wireless communications system 100, a base station 105 may transmit control information to a UE 115 over a PDCCH. The UE 115 may monitor one or more PDCCH candidates in a search space for the PDCCH including the control information from the base station 105, where each PDCCH candidate may be a possible location for the PDCCH including the control information from the base station 105. In other words, the UE 115 may blind decode different PDCCH candidates to identify the control information that was transmitted by the base station 105. The search space may include multiple CCEs, each of which may be a group of resources which can be used to send the PDCCH. CCEs may also be grouped for larger control transmissions. In some cases, it may be appropriate to provide limitations on the number of blind decoding or PDCCH candidates in a search space per slot and a limitation on the number of non-overlapping CCEs per slot. Such limitations may limit complexity at a UE 115 since the UE 115 may be configured to monitor fewer PDCCH candidates and resources for control information from a base station 105. Tables 2 and 3 provide examples of limitations on blind decoding and non-overlapping CCEs per slot.

TABLE 1

Maximum number ($M_{PDCCH}^{max,slot,\mu}$) of monitored PDCCH candidates per slot for a downlink bandwidth part with subcarrier spacing configuration $\mu$ ∈ {0, 1, 2, 3} for a single serving cell

| $\mu$ | $M_{PDCCH}^{max,slot,\mu}$ |
|---|---|
| 0 | 44 |
| 1 | 36 |
| 2 | 22 |
| 3 | 20 |

TABLE 2

Maximum number ($C_{PDCCH}^{max,slot,\mu}$) of non-overlapped CCEs per slot for a downlink bandwidth part with subcarrier spacing configuration $\mu$ ∈ {0, 1, 2, 3} for a single serving cell

| $\mu$ | $C_{PDCCH}^{max,slot,\mu}$ |
|---|---|
| 0 | 56 |
| 1 | 56 |
| 2 | 48 |
| 3 | 32 |

For each scheduled cell, a UE 115 may be configured to monitor no more than the maximum number ($M_{PDCCH}^{max,slot,\mu}$) of PDCCH candidates per slot for a subcarrier spacing (SCS) configuration $\mu$ as indicated in Table 1 or no more than a maximum number ($M_{PDCCH}^{total,slot,\mu}$) of PDCCH candidates per slot for an SCS configuration $\mu$ under carrier aggregation. In particular, the UE 115 may not be configured to monitor more than min ($M_{PDCCH}^{max,slot,\mu}$, $M_{PDCCH}^{total,slot,\mu}$) PDCCH candidates per slot on the active downlink bandwidth part with SCS configuration $\mu$. Similarly, for each scheduled cell, the UE 115 may be configured to monitor no more than the maximum number ($C_{PDCCH}^{max,slot,\mu}$) of non-overlapped CCEs per slot for an SCS configuration $\mu$ as indicated in Table 2 or no more than a maximum number ($C_{PDCCH}^{total,slot,\mu}$) of PDCCH candidates per slot for an SCS configuration $\mu$ under carrier aggregation. In particular, the UE 115 may not be configured to monitor more than min ($C_{PDCCH}^{max,slot,\mu}$, $C_{PDCCH}^{total,slot,\mu}$) non-overlapped CCEs per slot on the active downlink bandwidth part with SCS configuration $\mu$.

In some cases, however, because different search space sets (which may be associated with the same or different control resource sets (CORESETs)) may have different periodicities, there may be a scenario in which the number of blind decoding candidates and the number of CCEs associated with the blind decoding candidates in a slot are more than the maximum values provided in Tables 1 and 2, respectively. Such a scenario may be referred to as overbooking and may be allowed on a primary cell (PCell) or primary-secondary cell (PSCell) and not on secondary cells (SCells). In other words, on SCells, the limitations described with reference to Tables 1 and 2 may be satisfied (e.g., always). To handle overbooking, a UE 115 may support techniques for dropping blind decoding candidates and CCEs to limit complexity. Dropping may be specified for user-specific search spaces (USSs), and no dropping may be specified for CSSs. That is, the blind decoding candidates and CCEs for the CSS sets may be protected (e.g., always).

For all search space sets within a slot n, a set of CSS sets with a cardinality of $I_{CSS}$ may be denoted by $S_{CSS}$, and a set of USS sets with a cardinality of $J_{USS}$ may be denoted by $S_{USS}$. The location of USS sets $s_j$, $0 \le j \le J_{USS}$ in $S_{USS}$ may be according to an ascending order of the search space set index. The number of counted PDCCH candidates for monitoring for a CSS set $S_{CSS}(i)$ may be denoted by $M_{S_{CSS}(i)}^{(L)}$, and the number of counted PDCCH candidates for monitoring for a USS set $S_{USS}(j)$ may be denoted by $M_{S_{USS}(j)}^{L}$. For the CSS sets, a UE 115 may monitor $M_{PDCCH}^{CSS} = \sum_{i=0}^{I_{CSS}-1} \sum_L M_{S_{CSS}(i)}^{(L)}$ PDCCH candidates requiring a total of $C_{PDCCH}^{CSS}$ non-overlapping CCEs in a slot. That is, for the CSS sets, the UE 115 may monitor all PDCCH candidates, and the UE 115 may avoid dropping any blind decoding candidates or CCEs. For the USS sets, however, a UE 115 may monitor a subset of PDCCH candidates and a subset of CCEs. That is, the UE 115 may drop blind decoding candidates and CCEs in excess of the maximum values described with reference to Tables 1 and 2.

In one example, for a Pcell having an active downlink bandwidth part with an SCS configuration µ in slot n, a UE 115 may allocate PDCCH candidates according to a dropping rule, and the UE 115 may not expect to monitor PDCCH in a USS set without allocated PDCCH candidates for monitoring. The set of non-overlapping CCEs for search space $S_{USS}(j)$ may be denoted by $V_{CCE}(S_{USS}(j))$, and the cardinality of $V_{CCE}(S_{USS}(j))$ may be denoted by cardinality $(V_{CCE}(S_{USS}(j)))$. The non-overlapping CCEs for search space set $S_{USS}(j)$ may be determined considering the allocated PDCCH candidates for monitoring for the CSS sets and the allocated PDCCH candidates for monitoring for all search space sets $S_{USS}(k)$, $0 \le k \le j$. The dropping rule may correspond to the following pseudocode:

---

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\Sigma_L M_{S_{uss}(j)}^L \le M_{PDCCH}^{uss}$ AND cardinality$(V_{CCE}(S_{uss}(j))) \le C_{PDCCH}^{uss}$
    allocate $\Sigma_L M_{S_{uss}(j)}^L$ PDCCH candidates for monitoring USS set $S_{uss}(j)$
    $M_{PDCCH}^{uss} = M_{PDCCH}^{uss} - \Sigma_L M_{S_{uss}(j)}^L$
    $C_{PDCCH}^{uss} = C_{PDCCH}^{uss} - $ cardinality$(V_{CCE}(S_{uss}(j)))$
    j = j + 1
end while

---

In some wireless communications systems (e.g., wireless communications systems supporting URLLC), an updated PDCCH monitoring capability may be supported. For instance, similar to a PDCCH monitoring capability 3-5b, a UE 115 may be configured to monitor multiple spans per slot, where a span may correspond to a subset of the OFDM symbols within a slot. PDCCH monitoring occasions associated with some features (e.g., in a feature group (FG) 3-1), plus additional PDCCH monitoring occasions may be in any OFDM symbols of a slot (e.g., for a case 2). For any two PDCCH monitoring occasions belonging to different spans, provided that at least one PDCCH monitoring occasion is not one of the PDCCH monitoring occasions associated with FG-3-1, in same or different search spaces, there may be a minimum time separation of X OFDM symbols (including the cross-slot boundary case) between the start of two spans, where each span is of length up to Y consecutive OFDM symbols of a slot. Each span may include multiple search spaces, and there may be two spans in a slot if (X, Y)=(7,3), three spans in a slot if (X, Y)=(4,3), and seven spans in a slot if (X, Y)=(2,2).

Spans may not overlap, and every span may be contained in a single slot. The same span pattern may repeat in every slot. The separation between consecutive spans within and across slots may be unequal, but the same (X,Y) limit may be satisfied by all spans. Every monitoring occasion may be fully contained in one span. In order to determine a suitable span pattern, first a bitmap b(l), $0 \le l \le 13$ may be generated, where b(l)=1 if symbol l of any slot is a part of a monitoring occasion, and b(l)=0 otherwise. The first span in the span pattern may begin at the smallest l for which b(l)=1. The next span in the span pattern may begin at the smallest l not included in the previous spans for which b(l)=1. The span duration may be the higher value of the maximum value of all CORESET durations and the minimum value of Y in the UE reported candidate value, except possibly the last span in a slot which can be of shorter duration. A PDCCH monitoring configuration may meet the UE capability limitation if the span arrangement satisfies the gap separation for at least one (X,Y) in the UE reported candidate value set in every slot, including cross slot boundary.

In some cases, a UE 115 may process control information using various techniques for the set of monitoring occasions that are within the same span. In one example, the UE 115 may process one unicast downlink control information (DCI) scheduling downlink communications and one unicast DCI scheduling uplink communications per scheduled component carrier across the set of monitoring occasions for FDD. In another example, the UE 115 may process one unicast DCI scheduling downlink communications and two unicast DCI scheduling uplink communications per scheduled component carrier across the set of monitoring occasions for TDD. In yet another example, the UE 115 may process two unicast DCI scheduling downlink communications and one unicast DCI scheduling uplink communications per scheduled component carrier across the set of monitoring occasions for TDD. The number of different start symbol indices of spans for all PDCCH monitoring occasions per slot, including PDCCH monitoring occasions of FG-3-1, may be no more than floor(14/X), where X is the minimum among values reported by a UE 115. The number of different start symbol indices of PDCCH monitoring occasions per slot including PDCCH monitoring occasions of FG-3-1, may be no more than seven. The number of different start symbol indices of PDCCH monitoring occasions per half-slot including PDCCH monitoring occasions of FG-3-1 may be no more than four in an SCell.

As described above, the techniques for dropping blind decoding candidates and CCEs may be supported to limit decoding complexity at a UE 115. However, in systems in which a UE 115 is configured to monitor PDCCH candidates in multiple spans in a slot for control information from a base station 105, the limit on the number of blind decoding candidates and CCEs may be per span (e.g., instead of per slot). Accordingly, the UE 115 may perform CCE or blind decoding candidate counting and dropping multiple times per slot instead of once per slot (e.g., because there may be multiple spans per slot), which may result in increased complexity at the UE 115. UEs 115 in the wireless communications system 100 may support efficient techniques for monitoring for control information from a base station 105 with limited complexity.

Figure 2:
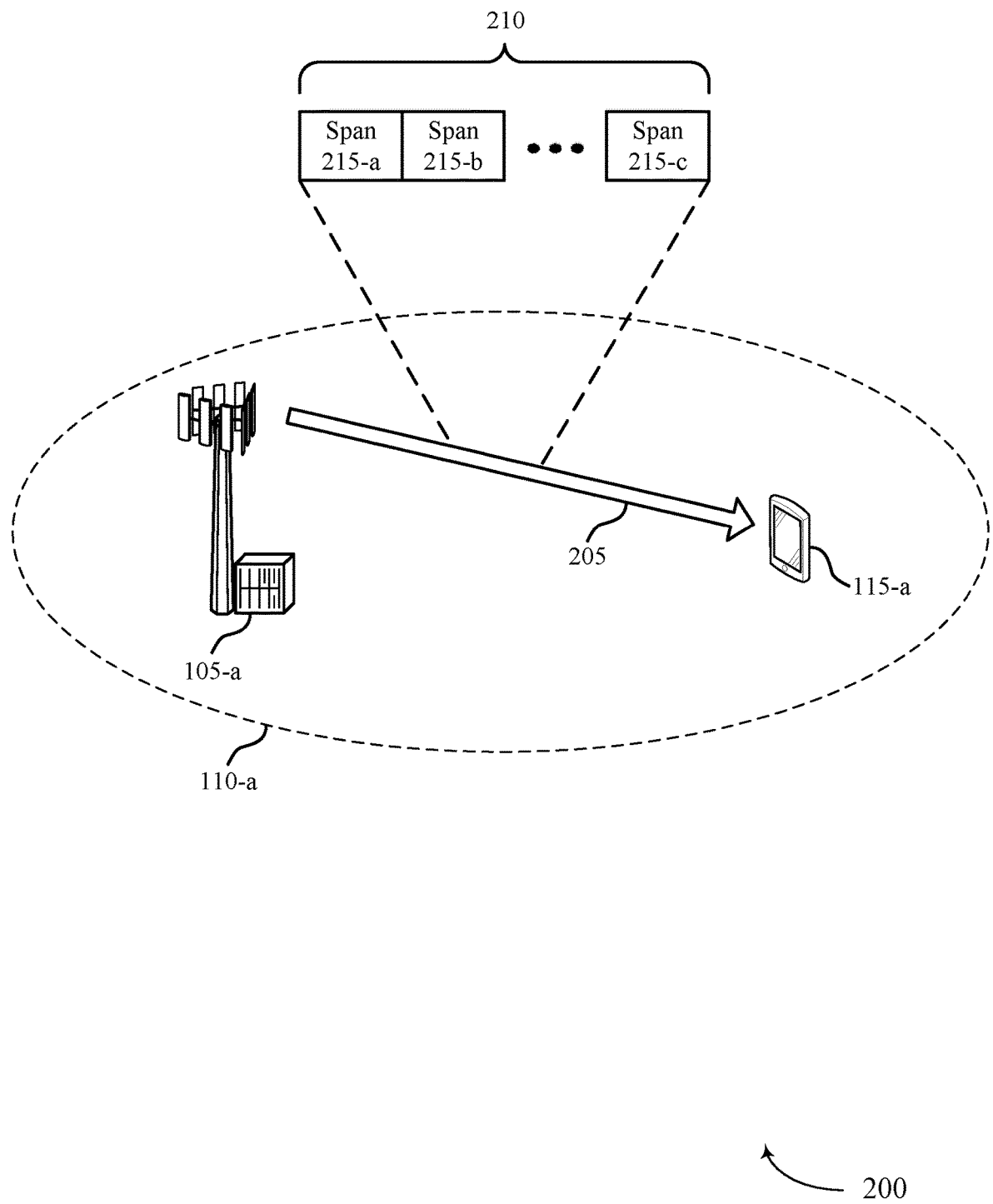
FIG. 2 illustrates an example of a wireless communications system that supports relaxed CCE and blind decoding overbooking and dropping for NR URLLC in accordance with aspects of the present disclosure.

FIG. 2 illustrates an example of a wireless communications system 200 that supports relaxed CCE and blind decoding overbooking and dropping for NR URLLC in accordance with aspects of the present disclosure. The wireless communications system 200 includes a UE 115-*a*, which may be an example of a UE 115 as described with reference to FIG. 1. The wireless communications system 200 also includes a base station 105-*a*, which may be an example of a base station 105 as described with reference to FIG. 1. The base station 105-*a* may provide communication coverage for a coverage area 110-*a*. For example, the base station 105-*a* may communicate with the UE 115-*a* with the coverage area 110-*a* over resources of a carrier 205. The wireless communications system 200 may implement aspects of the wireless communications system 100. For example, the UE 115-*a* in the wireless communications system 200 may support efficient techniques for monitoring for control information from the base station 105-*a* with limited complexity.

For example, if the UE 115-*a* is configured to monitor PDCCH candidates for control information from the base station 105-*a* in multiple spans 215 (including a span 215-*a*, a span 215-*b*, and a span 215-*c*) in a slot 210, the UE 115-*a* may be expected to perform blind decoding candidate or CCE dropping in a subset of the spans 215 in the slot 210 (e.g., on a PCell or a PSCell) due to overbooking in the slot 210. In other words, the UE 115-*a* may identify a dropping rule for the UE 115-*a* to drop CCE monitoring occasions or blind decoding attempts in excess of the maximum number of non-overlapping CCE per span or the maximum number of blind decoding attempts per span, respectively, and the UE 115-*a* may apply the dropping rule to fewer than all of the spans 215 in the slot 210. In some cases, the UE 115-*a* may perform dropping in the spans 215 in which CSS is present (e.g., it may be unnecessary to perform dropping in other spans).

In some cases, the UE 115-*a* may perform dropping in a fixed set of spans (of the multiple spans 215) in the slot 210. For example, the fixed set of spans may include a single span (of the multiple spans 215) in the slot 210, a consecutive number of spans (of the multiple spans 215) from the beginning of the slot 210, or a consecutive number of spans (of the multiple spans 215) from the end of the slot 210. The fixed set of spans may also include temporally-spaced spans (of the multiple spans 215) within the slot 210 (e.g., every other span). In some cases, the UE 115-*a* may also perform dropping in the fixed set of spans (of the multiple spans 215) in the slot 210 where the fixed set of spans includes a first span in time (of the multiple spans 215) in the slot 210, or where the fixed set of spans is a single span including the first span in time (of the multiple spans 215) in the slot 210. In some cases, the UE 115-*a* may also perform dropping in the fixed set of spans (of the multiple spans 215) in the slot 210 where the fixed set of spans includes at least one span in which a CSS is present. For example, the CSS may be present and limited to a first span in time (of the multiple spans 215) in the slot 210. In some other cases, the UE 115-*a* may avoid performing dropping in any slot where CSS is not present (e.g., since CSS may not be present in all slots due to the periodicity of CSS sets).

Figure 3:
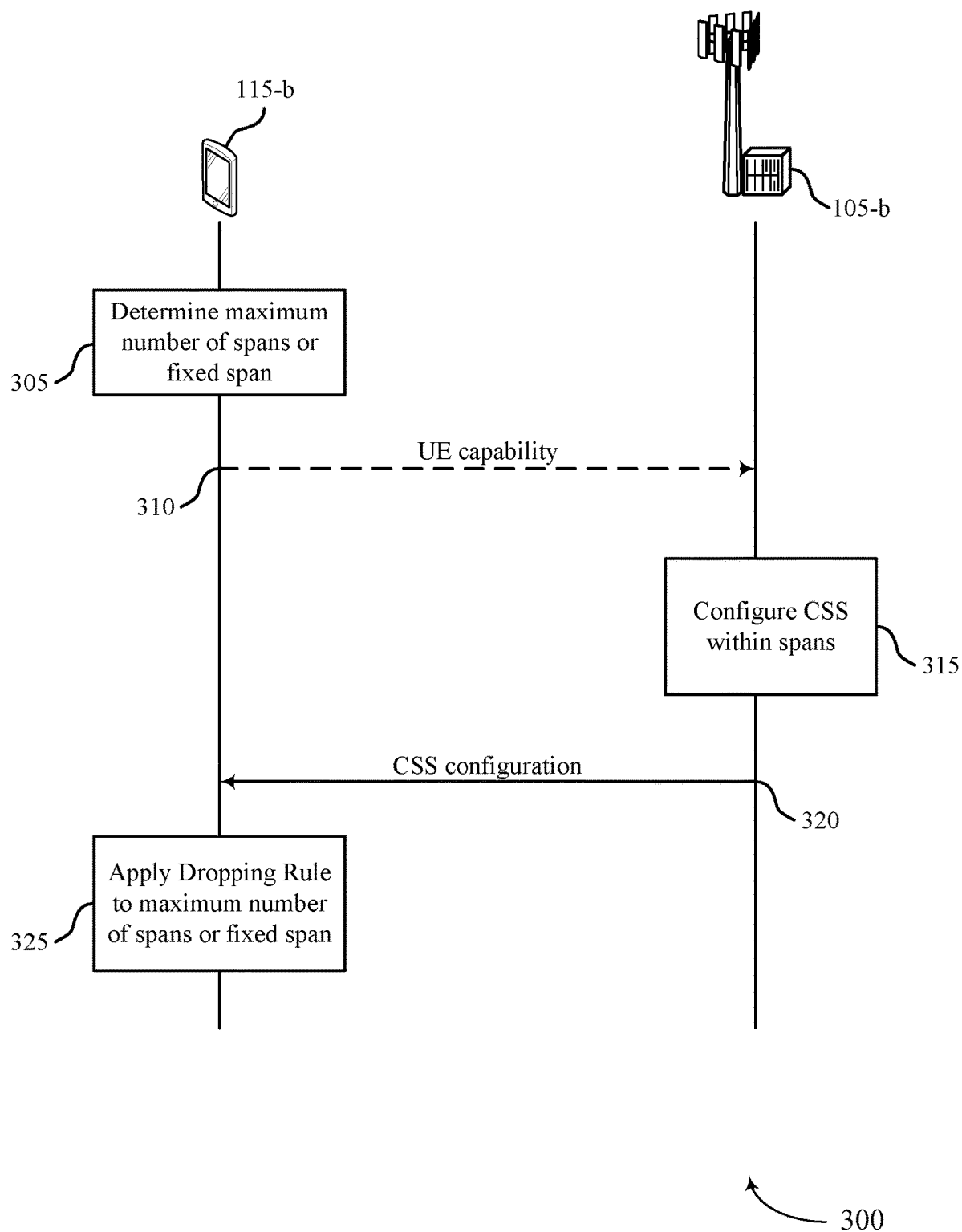
FIG. 3 illustrates an example of a process flow that supports relaxed CCE and blind decoding overbooking and dropping for NR URLLC in accordance with aspects of the present disclosure.

FIG. 3 illustrates an example of a process flow 300 that supports relaxed CCE and blind decoding overbooking and dropping for NR URLLC in accordance with aspects of the present disclosure. The process flow 300 illustrates aspects of techniques performed by a UE 115-*b*, which may be an example of a UE 115 as described with reference to FIGS. 1 and 2. The process flow 300 also illustrates aspects of techniques performed by a base station 105-*b*, which may be an example of a base station 105 as described with reference to FIGS. 1 and 2. The UE 115-*b* in the process flow 300 may support efficient techniques for monitoring for control information from the base station 105-*b* with limited complexity. For example, the UE 115-*b* may be configured with a maximum number of spans (e.g., as a UE capability or as a pre-configuration) in which the UE 115-*b* may perform dropping of blind decoding candidates and CCEs to limit complexity.

At 305, the UE 115-*b* may determine, as a UE capability or as a pre-configuration, a maximum number of spans in which the UE 115-*b* is able to apply a dropping rule. Thus, based on the maximum number of spans, the UE 115-*b* may apply the dropping rule to fewer than all of the spans within a slot in which the UE 115-*b* is configured to monitor PDCCH candidates for control information from the base station 105-*b*. In examples in which the UE 115-*b* determines the maximum number of spans based on the UE capability, at 310, the UE 115-*b* may transmit the UE capability indicating the maximum number of spans to the base station 105-*b*. In examples in which the UE 115-*b* determines the maximum number of spans based on the pre-configuration, the UE 115-*b* may refrain from transmitting the UE capability to the base station 105-*b* at 310. In some cases, the maximum number of spans in which the UE 115-*b* is to apply the dropping rule may be the same for all values of X corresponding to the minimum time separation between spans (e.g., span timing) and all values of Y corresponding to span length (e.g., length configurations). Alternatively, the maximum number of spans in which the UE 115-*b* is to apply the dropping rule may be different for different values of X and Y.

In yet other cases, the maximum number of spans in which the UE 115-*b* is to apply the dropping rule may be different based on whether a PCell is configured with a first or second PDSCH or PUSCH minimum processing time capability (e.g., a minimum processing time capability number one or number two). In such cases, the UE 115-*b* may determine the maximum number of spans in which the UE 115-*b* is able to apply the dropping rule based on the PDSCH or PUSCH minimum processing time capability of a cell with which the UE communicates over the slot.

Additionally or alternatively, at 305, the UE 115-*b* may determine, as a UE capability or a pre-configuration, a fixed span (or a fixed set of spans) in which the UE 115-*b* is able to apply a dropping rule. Thus, based on the fixed span, the UE 115-*b* may apply the dropping rule to fewer than all of the spans within a slot in which the UE 115-*b* is configured to monitor PDCCH candidates for control information from the base station 105-*b*. In examples in which the UE 115-*b* determines the fixed span based on the UE capability, at 310, UE 115-*b* may transmit the UE capability indicating the fixed set of spans to the base station 105-*b*. In examples in which the UE 115-*b* determines the fixed span based on the pre-configuration, the UE 115-*b* may refrain from transmitting the UE capability to the base station 105-*b* at 310. In examples in which the UE 115-*b* identifies or otherwise determines a fixed set of spans, the fixed set of spans may include a first temporal span (e.g., a first span in time) within the slot. In examples in which the UE 115-*b* identifies or otherwise determines a fixed span, the fixed span may be a single span and include the first temporal span (e.g., the first span in time) within the slot.

In some implementations, such as in implementations in which the UE 115-*b* transmits the UE capability at 310, the base station 105-*b* may receive the UE capability message from the UE 115-*b* indicating the maximum number of spans or the fixed span in which the UE 115-*b* is to apply the dropping rule. At 315, the base station 105-*b* may configure one or more CSS within spans of a slot for communications with the UE 115-*b* such that a number of spans within the slot that include a CSS is less than or equal to the maximum number of spans per slot indicated by the UE capability. That is, the base station 105-*b* may ensure that CSS sets fail to exist in more spans than the maximum number of spans in any slot of a PCell or PSCell indicated by the UE 115-*b*.

Additionally or alternatively, at 315, the base station 105-*b* may configure one or more CSSs within spans of a slot for communications with the UE 115-*b* such that at least one span of the fixed set of spans within the slot indicated by the UE capability includes a CSS. That is, the base station 105-*b* may ensure that CSS sets exist (e.g., only exist) in the fixed set of spans in any slot of a PCell or PSCell. In some cases, the at least one span of the fixed set of spans may be a first span in time within the slot. In some cases, the CSS may be the only CSS configured within the spans of the slot for communication with the UE 115-*b*. In some cases, base station 105-*b* may configure a limited number of CSSs. The limited number of CSSs may be included with at least one (but in some cases all) of the fixed set of spans within the slot. For example, base station 105-*b* may configure a single CSS to be included with a first span in time within the slot. In some cases, configuring the single CSS to be included with the first span in time within the slot may be performed irrespective of the UE capability, as the base station 105-*b* may assume that the UE 115-*b* is capable of dropping the first span in time within the slot that includes the only CSS in the slot. Additionally or alternatively, the base station 105-*b* may identify the fixed span (or the fixed set of spans) in which the UE 115-*b* is to apply the dropping rule without signaling from the UE 115-*b* (e.g., based on a pre-configuration), and may configure one or more CSSs within spans of the slot including at least the fixed span.

At 320, the base station 105-*b* may then indicate, to the UE 115-*b*, a CSS configuration in accordance with the configuring at 315. For example, the CSS configuration may indicate that a number of spans within a slot that include a CSS is less than or equal to the maximum number of spans per slot indicated by the UE capability, or the CSS configuration may indicate that at least one span of the fixed set of spans within the slot indicated by the UE capability includes a CSS.

At 325, the UE 115-*b* may apply the dropping rule to the maximum number of spans or to the fixed span. In some examples, the fixed span may include the first temporal span of the slot and the UE 115-*b* may accordingly apply the dropping rule to the first temporal span of the slot.

Figure 4:
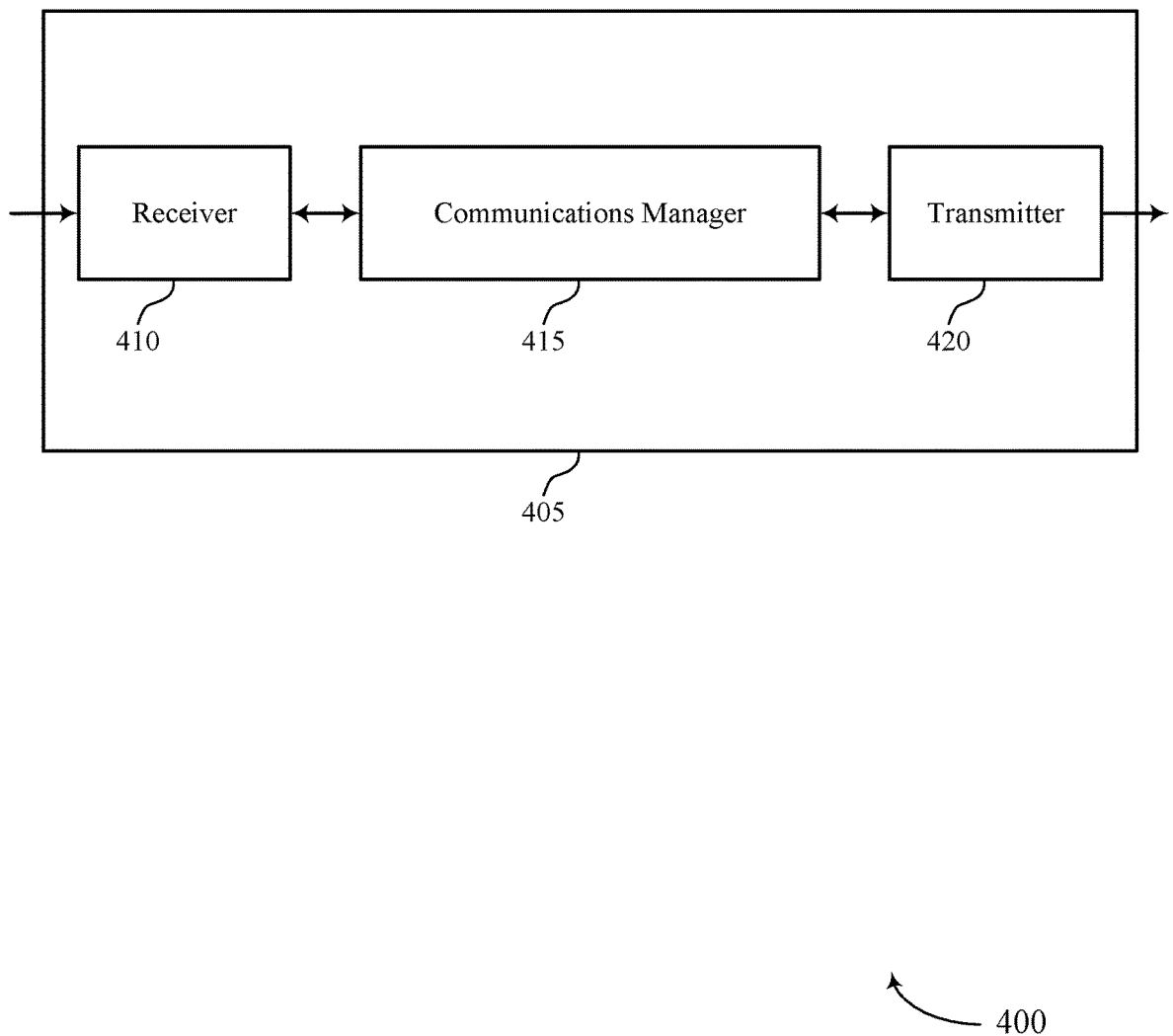
FIGS. 4 and 5 show block diagrams of devices that support relaxed CCE and blind decoding overbooking and dropping for NR URLLC in accordance with aspects of the present disclosure.

FIG. 4 shows a block diagram 400 of a device 405 that supports relaxed CCE and blind decoding overbooking and dropping for NR URLLC in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to relaxed CCE and blind decoding overbooking and dropping for NR URLLC, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine that the UE is configured to use blind decoding for monitoring control channel elements in a control resource set in accordance with at least one of a maximum number of blind decoding attempts per span within a slot or a maximum number of non-overlapping control channel elements per span within the slot, identify a dropping rule for the UE to drop control channel element monitoring occasions or blind decoding attempts in excess of the maximum number of non-overlapping control channel elements per span or the maximum number of blind decoding attempts per span, respectively, and apply the dropping rule to fewer than all spans within the slot. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and the transmitter 420 may be implemented as analog components (for example, amplifiers, filters, antennas) coupled to the mobile device modem to enable wireless transmission and reception over one or more bands.

The communications manager 415 may be implemented to realize one or more potential advantages. In some implementations, the communications manager 415 may identify a fixed span in which the communications manager 415 may apply a dropping rule to address PDCCH overbooking within the fixed span (e.g., PDCCH overbooking may be constrained to be within the fixed span). As such, the communications manager 415, or one or more processing components of the communications manager 415 associated with the application of a dropping rule, may apply the dropping rule within the fixed span and refrain from applying the dropping rule outside of the fixed span, which may enable the communications manager 415, or the one or more processing components of the communications manager 415 associated with the application of the dropping rule, to enter a sleep mode more frequently or for longer durations. As such, the communications manager 415 may consume less power, which may improve power savings and increase battery life at the device 405.

Figure 5:
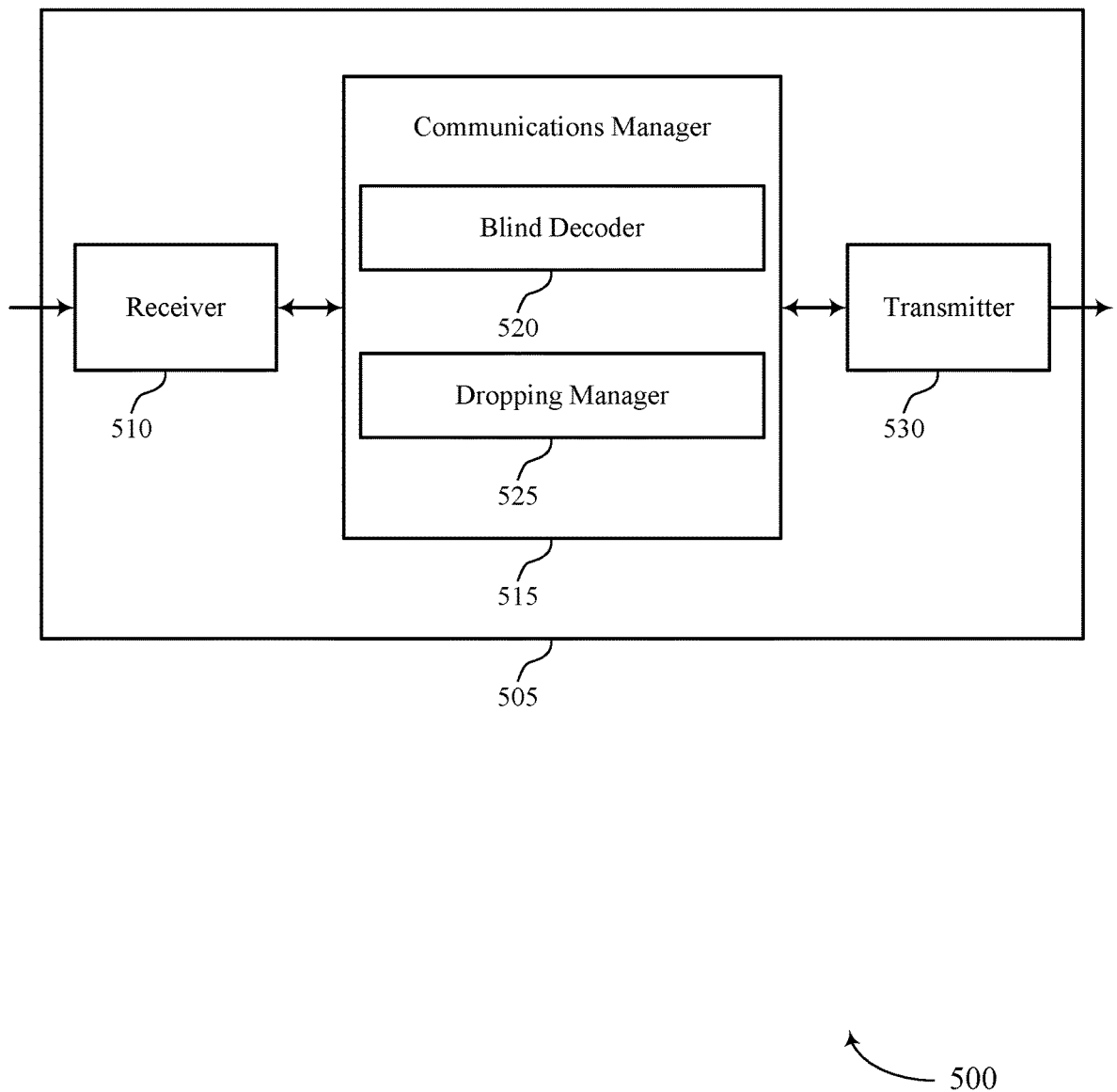

FIG. 5 shows a block diagram 500 of a device 505 that supports relaxed CCE and blind decoding overbooking and dropping for NR URLLC in accordance with aspects of the present disclosure. The device 505 may be an example of aspects of a device 405, or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to relaxed CCE and blind decoding overbooking and dropping for NR URLLC, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a blind decoder 520 and a dropping manager 525. The communications manager 515 may be an example of aspects of the communications manager 710 described herein.

The blind decoder 520 may determine that the UE is configured to use blind decoding for monitoring control channel elements in a control resource set in accordance with at least one of a maximum number of blind decoding attempts per span within a slot or a maximum number of non-overlapping control channel elements per span within the slot. The dropping manager 525 may identify a dropping rule for the UE to drop control channel element monitoring occasions or blind decoding attempts in excess of the maximum number of non-overlapping control channel elements per span or the maximum number of blind decoding attempts per span, respectively and apply the dropping rule to fewer than all spans within the slot.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
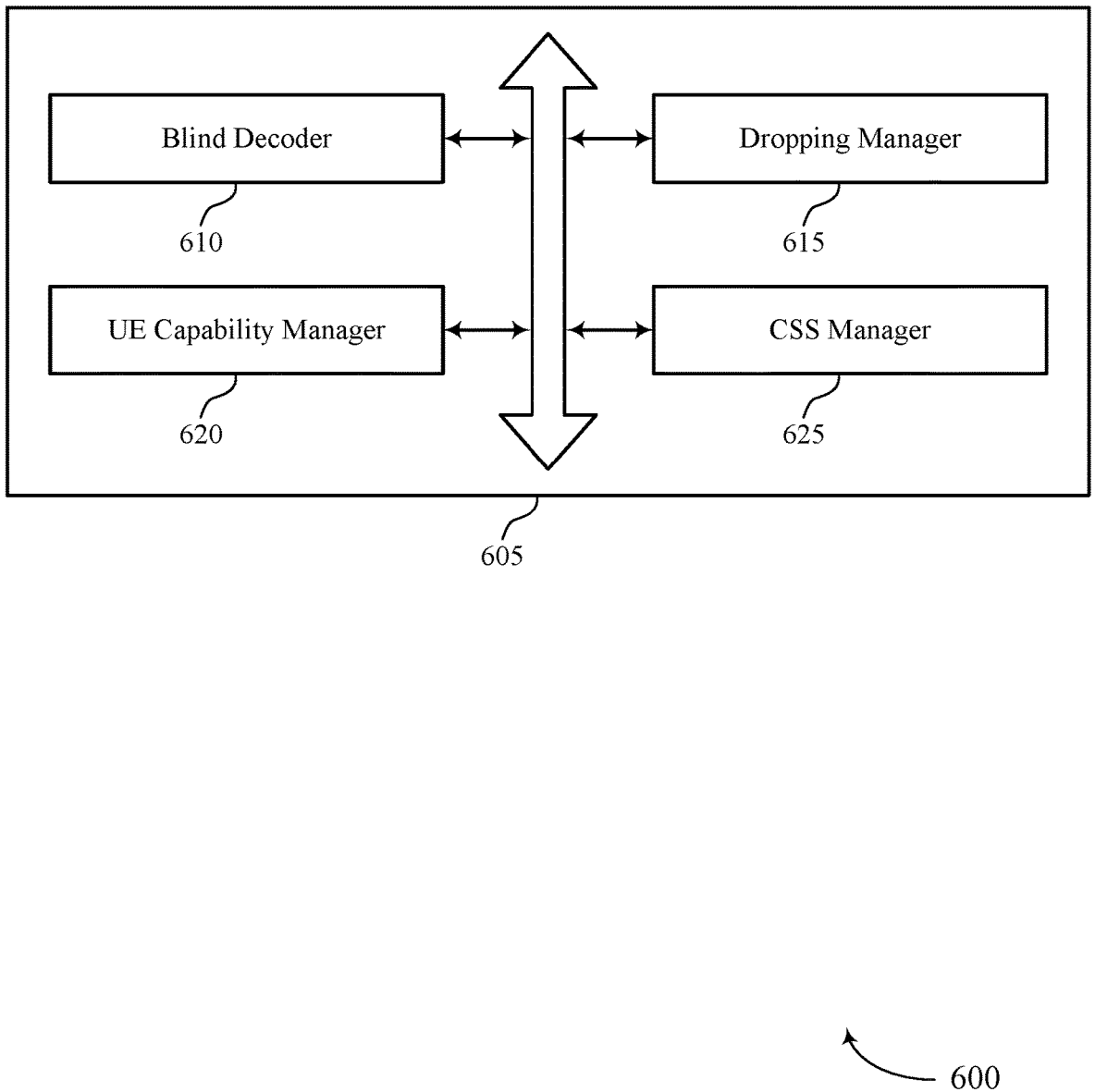
FIG. 6 shows a block diagram of a communications manager that supports relaxed CCE and blind decoding overbooking and dropping for NR URLLC in accordance with aspects of the present disclosure.

FIG. 6 shows a block diagram 600 of a communications manager 605 that supports relaxed CCE and blind decoding overbooking and dropping for NR URLLC in accordance with aspects of the present disclosure. The communications manager 605 may be an example of aspects of a communications manager 415, a communications manager 515, or a communications manager 710 described herein. The communications manager 605 may include a blind decoder 610, a dropping manager 615, a UE capability manager 620, and a CSS manager 625. Each of these modules may communicate, directly or indirectly, with one another (e.g., via one or more buses).

The blind decoder 610 may determine that the UE is configured to use blind decoding for monitoring control channel elements in a control resource set in accordance with at least one of a maximum number of blind decoding attempts per span within a slot or a maximum number of non-overlapping control channel elements per span within the slot. The dropping manager 615 may identify a dropping rule for the UE to drop control channel element monitoring occasions or blind decoding attempts in excess of the maximum number of non-overlapping control channel elements per span or the maximum number of blind decoding attempts per span, respectively. In some examples, the dropping manager 615 may apply the dropping rule to fewer than all of the spans within the slot.

In some examples, the dropping manager 615 may drop one or more control channel element monitoring occasions or one or more blind decoding attempts for only a number of spans in which a common search space is present. In some examples, the dropping manager 615 may drop one or more control channel element monitoring occasions or one or more blind decoding attempts for a number of spans in which a common search space is present and when the slot is for communications with either a PCell or a PSCell. In some examples, the dropping manager 615 may refrain from applying the dropping rule in a number of spans that do not include a common search space. In some examples, the dropping manager 615 may refrain from applying the dropping rule to any span within the slot based on the slot not including a common search space.

The UE capability manager 620 may determine a maximum number of spans in which the UE may apply the dropping rule, where applying the dropping rule to fewer than all of the spans within the slot is based on the maximum number of spans determined by the UE. In some examples, the maximum number of spans may be based on a UE capability and, in such examples, the UE capability manager 620 may transmit the UE capability to a base station. The CSS manager 625 may identify that a number of spans that include a common search space within the slot is in accordance with the UE capability. In some cases, the determined maximum number of spans is common for different span timing and length configurations for the UE. In some cases, the determined maximum number of spans is different for different span timing and length configurations for the UE.

In some examples, the UE capability manager 620 may determine the maximum number of spans in which the UE may apply the dropping rule based on a PDSCH or PUSCH minimum processing time capability of a cell with which the UE communicates over the slot. In some examples, the UE capability manager 620 may determine a fixed set of spans within the slot in which the UE may apply the dropping rule. In such examples, the dropping manager 615 may drop one or more control channel element monitoring occasions or one or more blind decoding attempts for only a number of spans in which a common search space is present, such that applying the dropping rule to fewer than all of the spans within the slot may include dropping one or more control channel element monitoring occasions or one or more blind decoding attempts for the fixed set of spans. In some cases, the fixed set of spans includes a first temporal span within the slot. In some cases, the fixed set of spans includes at least one span in which a CSS is present.

In some examples, the UE capability manager 620 may determine a fixed span within the slot in which the UE may apply the dropping rule. In such examples, the dropping manager 615 may drop one or more control channel element monitoring occasions or one or more blind decoding attempts for the fixed span, such that applying the dropping rule to fewer than all of the spans within the slot may include dropping one or more control channel element monitoring occasions or one or more blind decoding attempts for the fixed span. In some cases, the fixed span may include a first temporal span within the slot. In some cases, the fixed span includes a span in which a CSS is present.

Figure 7:
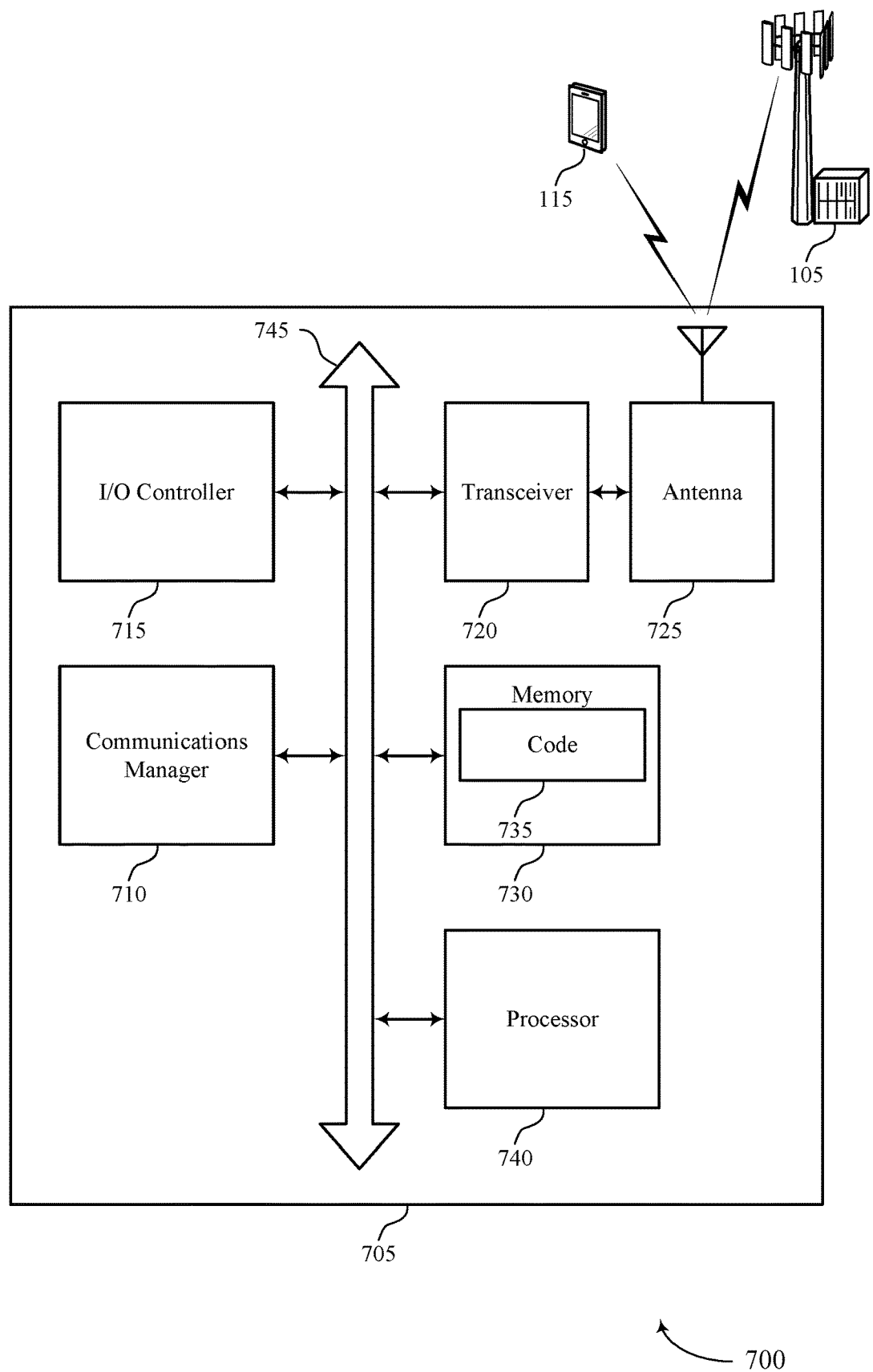
FIG. 7 shows a diagram of a system including a device that supports relaxed CCE and blind decoding overbooking and dropping for NR URLLC in accordance with aspects of the present disclosure.

FIG. 7 shows a diagram of a system 700 including a device 705 that supports relaxed CCE and blind decoding overbooking and dropping for NR URLLC in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine that the UE is configured to use blind decoding for monitoring control channel elements in a control resource set in accordance with at least one of a maximum number of blind decoding attempts per span within a slot or a maximum number of non-overlapping control channel elements per span within the slot, identify a dropping rule for the UE to drop control channel element monitoring occasions or blind decoding attempts in excess of the maximum number of non-overlapping control channel elements per span or the maximum number of blind decoding attempts per span, respectively, and apply the dropping rule to fewer than all spans within the slot.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting relaxed CCE and blind decoding overbooking and dropping for NR URLLC).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
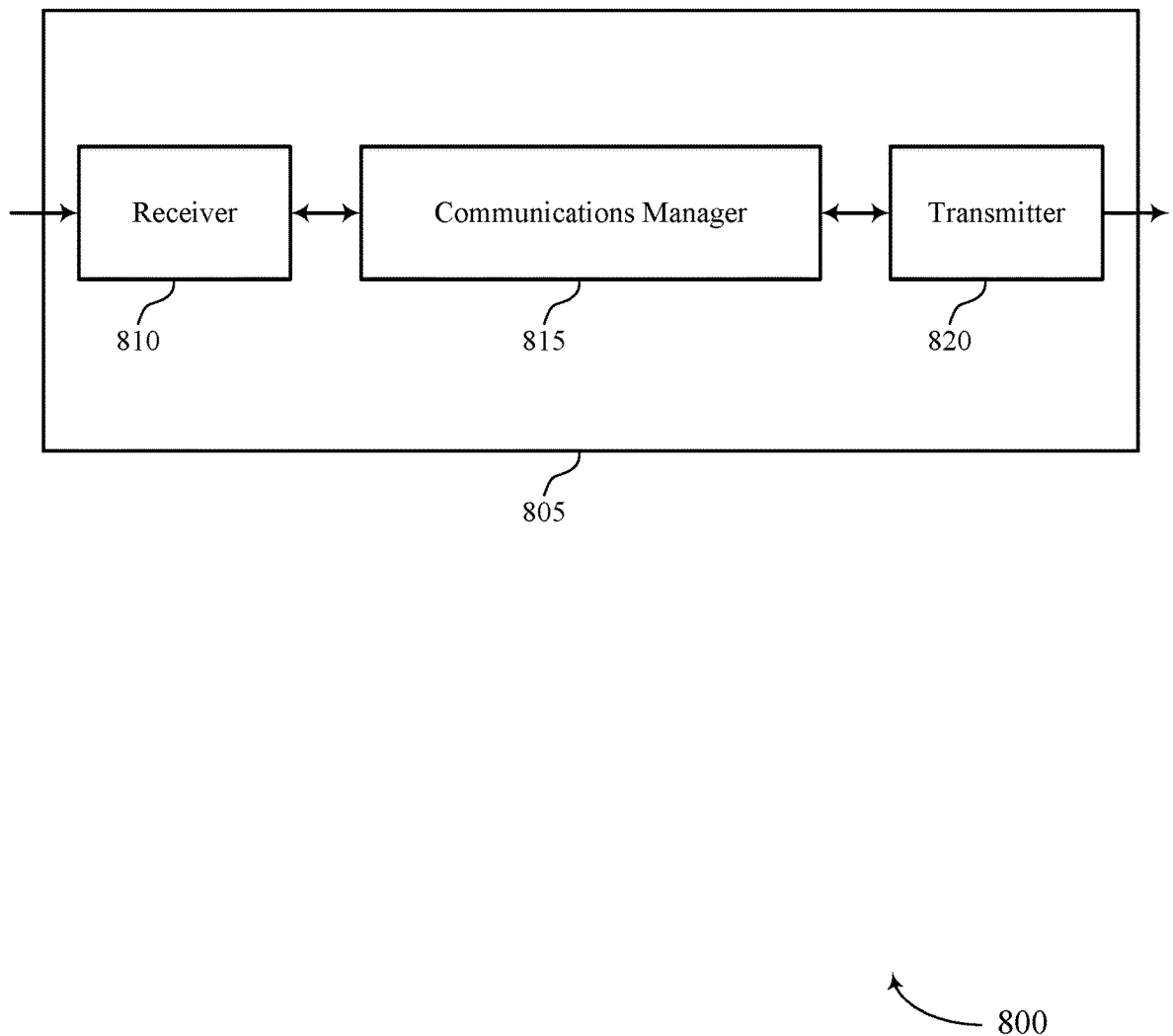
FIGS. 8 and 9 show block diagrams of devices that support relaxed CCE and blind decoding overbooking and dropping for NR URLLC in accordance with aspects of the present disclosure.

FIG. 8 shows a block diagram 800 of a device 805 that supports relaxed CCE and blind decoding overbooking and dropping for NR URLLC in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to relaxed CCE and blind decoding overbooking and dropping for NR URLLC, etc.). Information may be passed on to other components of the device 805. The receiver 810 may be an example of aspects of the transceiver 1120 described with reference to FIG. 11. The receiver 810 may utilize a single antenna or a set of antennas.

In some examples, the communications manager 815 may identify a maximum number of spans per slot in which the UE may apply a dropping rule, where the dropping rule indicates that the UE is to drop control channel element monitoring occasions or blind decoding attempts in accordance with the dropping rule, configure one or more common search spaces within spans of a slot for communication with the UE such that a number of spans within the slot that include a common search space is less than or equal to the maximum number of spans per slot, and indicate, to the UE, a common search space configuration in accordance with the configuring.

Additionally or alternatively, the communications manager 815 may identify a fixed span within a slot in which a UE may apply a dropping rule, where the dropping rule indicates that the UE is to drop control channel element monitoring occasions or blind decoding attempts in accordance with the dropping rule, configure one or more common search spaces within spans of the slot for communication with the UE such that at least the fixed span within the slot includes a common search space, and indicate, to the UE, a common search space configuration in accordance with the configuring. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 may be implemented to realize one or more potential advantages. In some implementations, the communications manager 815 may configure CSSs based on a fixed span (e.g., a first temporal span) within a slot over which the UE 115-a may apply a dropping rule for PDCCH overbooking. The CSS configuration based on such a defined fixed span for PDCCH overbooking may enable the communications manager 815 to support the scheduling and transmitting of control information to one or more UEs with lower latency, which may result in greater system capacity and increased throughput, among other benefits.

Figure 9:
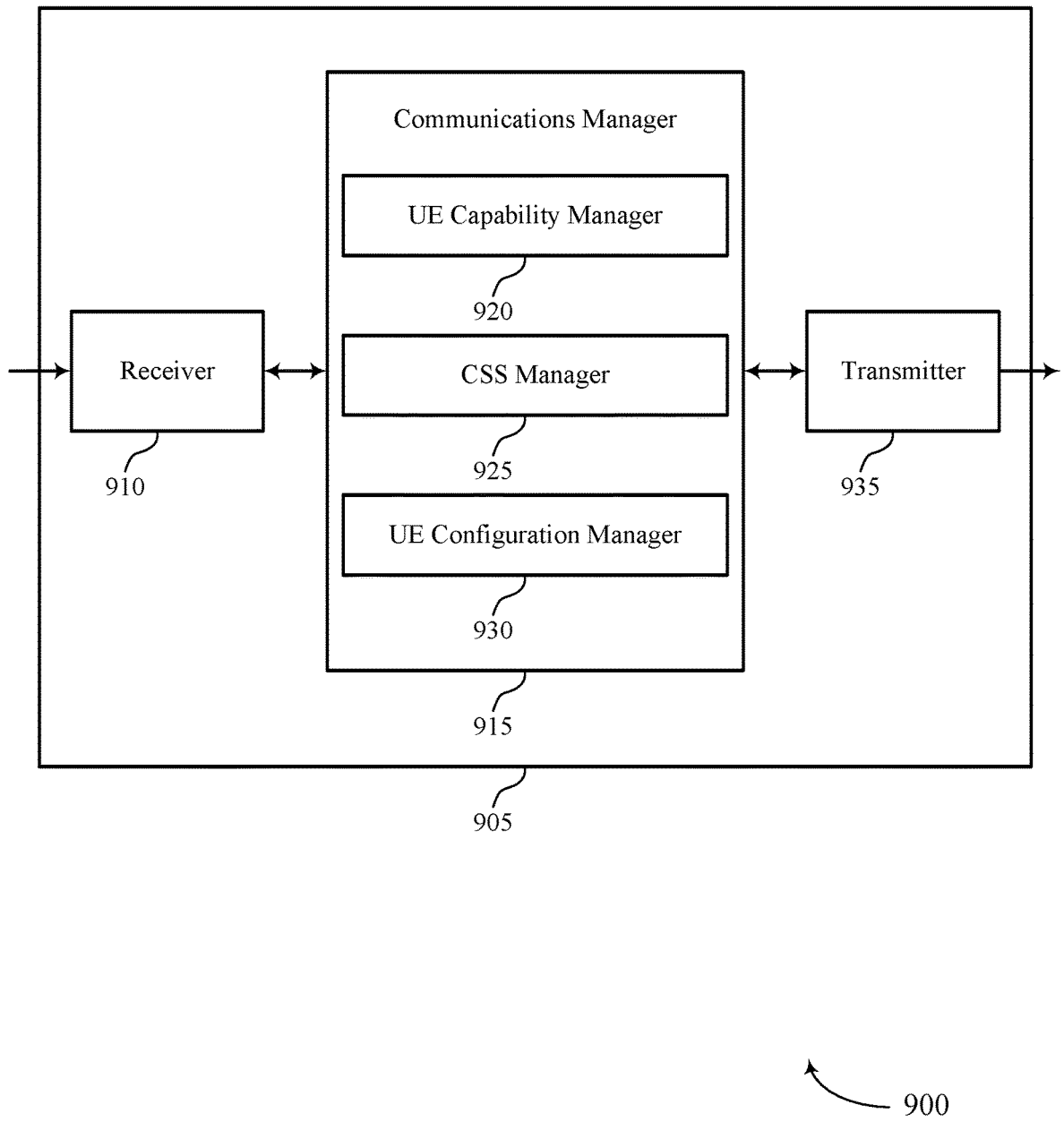

FIG. 9 shows a block diagram 900 of a device 905 that supports relaxed CCE and blind decoding overbooking and dropping for NR URLLC in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to relaxed CCE and blind decoding overbooking and dropping for NR URLLC, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE capability manager 920, a CSS manager 925, and a UE configuration manager 930. The communications manager 915 may be an example of aspects of the communications manager 1110 described herein.

The UE capability manager 920 may identify a maximum number of spans per slot in which the UE may apply a dropping rule, where the dropping rule indicates that the UE is to drop control channel element monitoring occasions or blind decoding attempts in accordance with the dropping rule. The CSS manager 925 may configure one or more common search spaces within spans of a slot for communication with the UE such that a number of spans within the slot that include a common search space is less than or equal to the maximum number of spans per slot. The UE configuration manager 930 may indicate, to the UE, a common search space configuration in accordance with the configuring.

Additionally or alternatively, the UE capability manager 920 may identify a fixed span within a slot in which a UE may apply a dropping rule, where the dropping rule indicates that the UE is to drop control channel element monitoring occasions or blind decoding attempts in accordance with the dropping rule. The CSS manager 925 may configure one or more common search spaces within spans of the slot for communication with the UE such that at least the fixed span within the slot includes a common search space. The UE configuration manager 930 may indicate, to the UE, a common search space configuration in accordance with the configuring.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
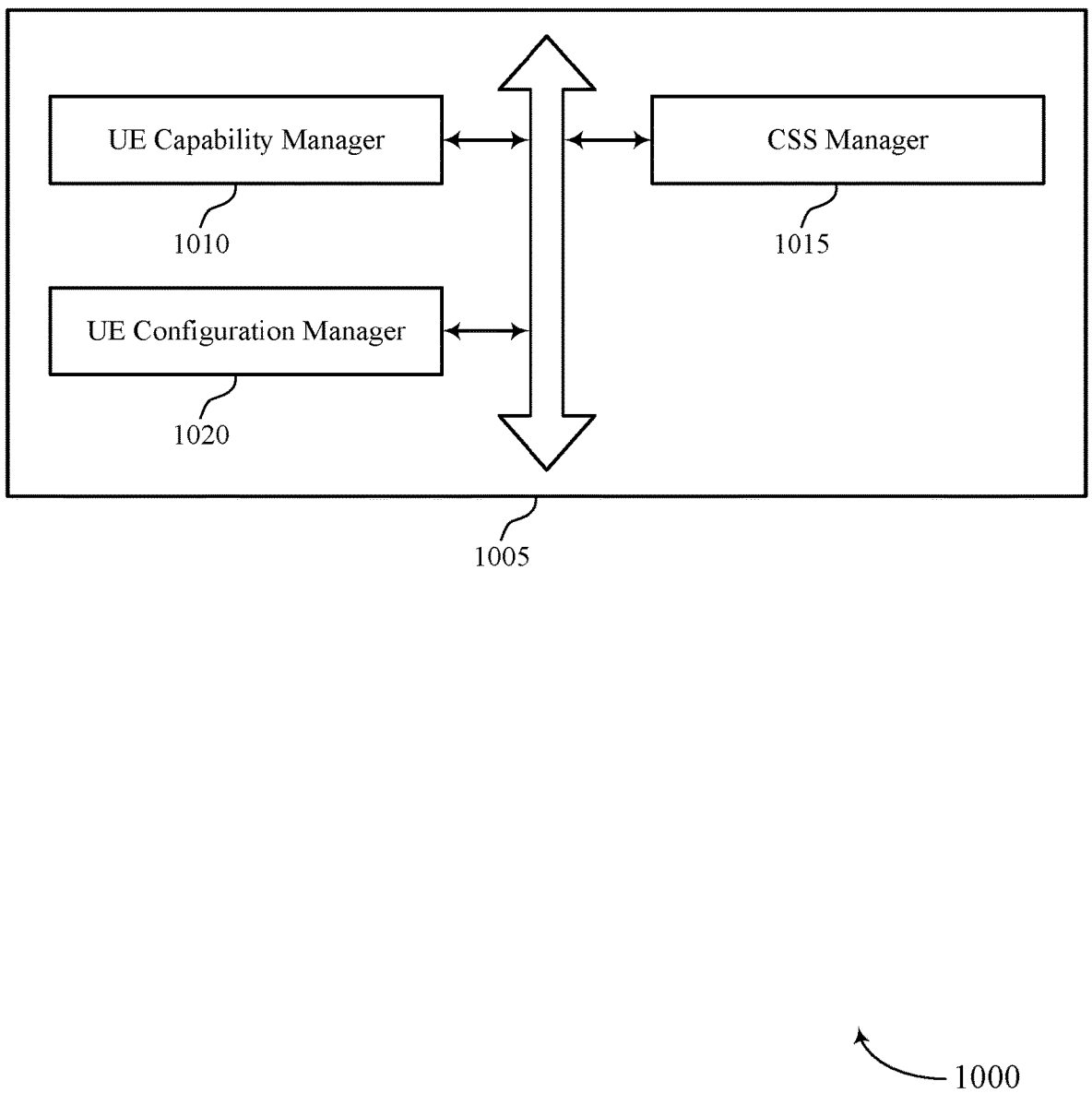
FIG. 10 shows a block diagram of a communications manager that supports relaxed CCE and blind decoding overbooking and dropping for NR URLLC in accordance with aspects of the present disclosure.

FIG. 10 shows a block diagram 1000 of a communications manager 1005 that supports relaxed CCE and blind decoding overbooking and dropping for NR URLLC in accordance with aspects of the present disclosure. The communications manager 1005 may be an example of aspects of a communications manager 815, a communications manager 915, or a communications manager 1110 described herein. The communications manager 1005 may include a UE capability manager 1010, a CSS manager 1015, and a UE configuration manager 1020. Each of these modules may communicate, directly or indirectly, with one another (e.g., via one or more buses).

The UE capability manager 1010 may identify a maximum number of spans per slot in which the UE may apply a dropping rule, where the dropping rule indicates that the UE is to drop control channel element monitoring occasions or blind decoding attempts in accordance with the dropping rule. The CSS manager 1015 may configure one or more common search spaces within spans of a slot for communication with the UE such that a number of spans within the slot that include a common search space is less than or equal to the maximum number of spans per slot. The UE configuration manager 1020 may indicate, to the UE, a common search space configuration in accordance with the configuring.

In some cases, the maximum number of spans is common for different span timing and length configurations for the UE. In some cases, the maximum number of spans is different for different span timing and length configurations for the UE. In some cases, the maximum number of spans is based on a PDSCH or PUSCH minimum processing time capability of a cell associated with the base station and with which the UE communicates over the slot. In some cases, the at least one span of the fixed set of spans is a first span in time within the slot. In some cases, the common search space is the only common search space configured within the spans of the slot for communication with the UE.

In some examples, the UE capability manager 1010 may identify a fixed span within a slot in which a UE is to apply a dropping rule, where the dropping rule indicates that the UE is to drop control channel element monitoring occasions or blind decoding attempts in accordance with the dropping rule. In some examples, the CSS manager 1015 may configure one or more common search spaces within spans of the slot for communication with the UE such that at least the fixed span within the slot includes a common search space. In some examples, the UE configuration manager 1020 may indicate, to the UE, a common search space configuration in accordance with the configuring. In some cases, the fixed span is a first temporal span within the slot. In some cases, the common search space is an only common search space configured within the spans of the slot for communication with the UE.

Figure 11:
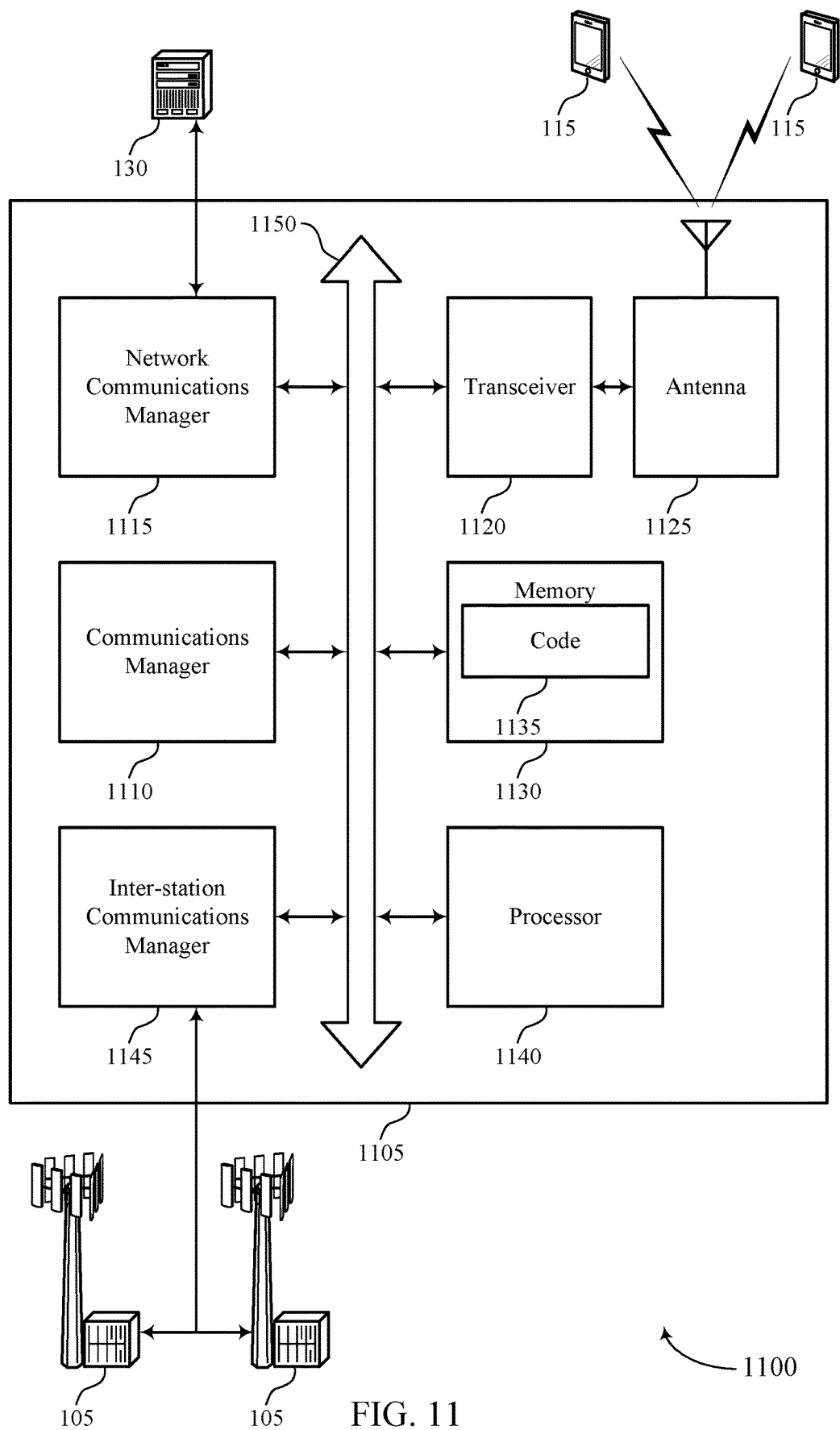
FIG. 11 shows a diagram of a system including a device that supports relaxed CCE and blind decoding overbooking and dropping for NR URLLC in accordance with aspects of the present disclosure.

FIG. 11 shows a diagram of a system 1100 including a device 1105 that supports relaxed CCE and blind decoding overbooking and dropping for NR URLLC in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

In some examples, the communications manager 1110 may identify a maximum number of spans per slot in which the UE may apply a dropping rule, where the dropping rule indicates that the UE is to drop control channel element monitoring occasions or blind decoding attempts in accordance with the dropping rule, configure one or more common search spaces within spans of a slot for communication with the UE such that a number of spans within the slot that include a common search space is less than or equal to the maximum number of spans per slot, and indicate, to the UE, a common search space configuration in accordance with the configuring.

Additionally or alternatively, the communications manager 1110 may identify a fixed span within a slot in which a UE may apply a dropping rule, where the dropping rule indicates that the UE is to drop control channel element monitoring occasions or blind decoding attempts in accordance with the dropping rule, configure one or more common search spaces within spans of the slot for communication with the UE such that at least the fixed span within the slot includes a common search space, and indicate, to the UE, a common search space configuration in accordance with the configuring.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting relaxed CCE and blind decoding overbooking and dropping for NR URLLC).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
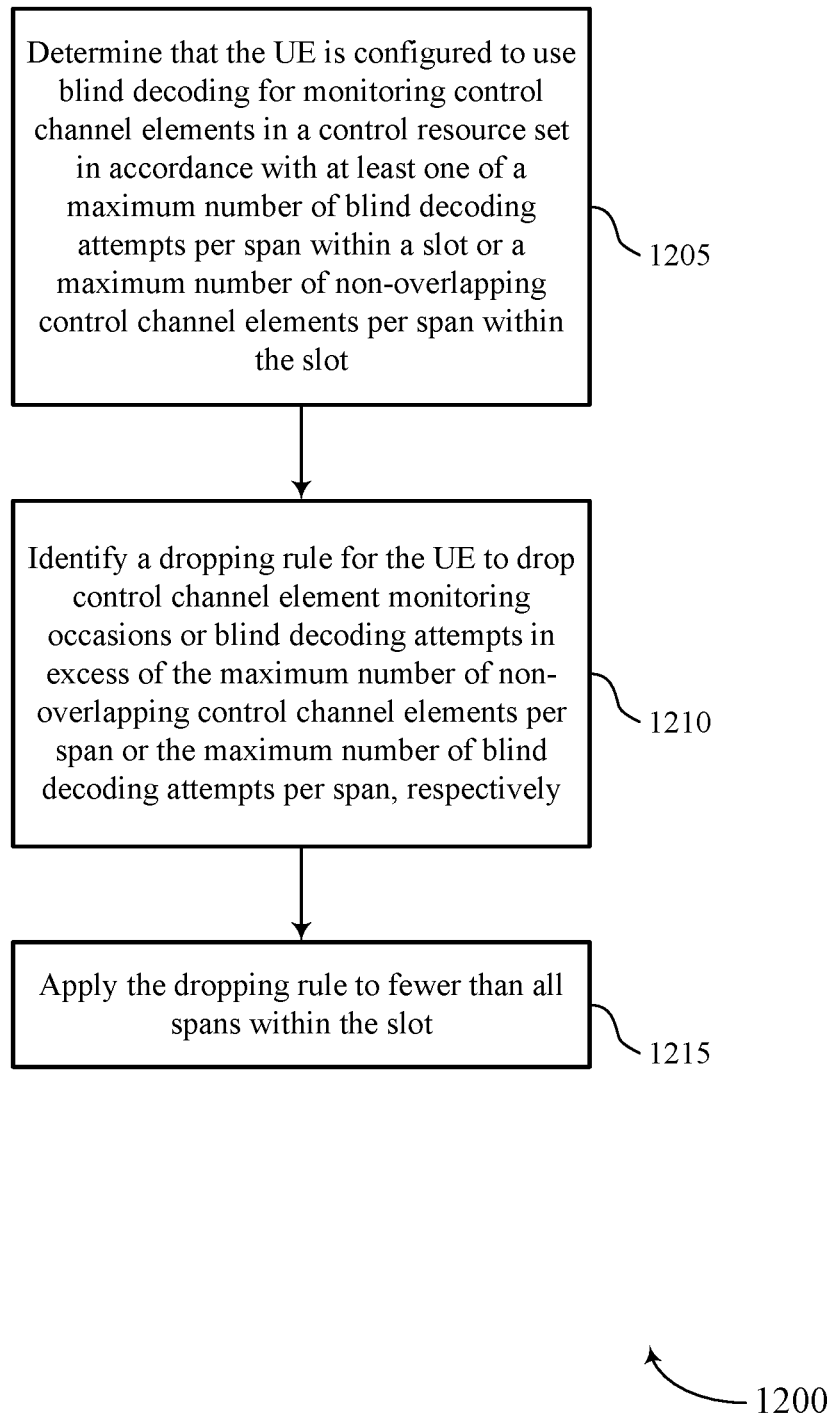
FIGS. 12 and 13 show flowcharts illustrating methods that support relaxed CCE and blind decoding overbooking and dropping for NR URLLC in accordance with aspects of the present disclosure.

FIG. 12 shows a flowchart illustrating a method 1200 that supports relaxed CCE and blind decoding overbooking and dropping for NR URLLC in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1205, the UE may determine that the UE is configured to use blind decoding for monitoring control channel elements in a control resource set in accordance with at least one of a maximum number of blind decoding attempts per span within a slot or a maximum number of non-overlapping control channel elements per span within the slot. The operations of 1205 may be performed according to the methods described herein. In some examples, aspects of the operations of 1205 may be performed by a blind decoder as described with reference to FIGS. 4 through 7.

At 1210, the UE may identify a dropping rule for the UE to drop control channel element monitoring occasions or blind decoding attempts in excess of the maximum number of non-overlapping control channel elements per span or the maximum number of blind decoding attempts per span, respectively. The operations of 1210 may be performed according to the methods described herein. In some examples, aspects of the operations of 1210 may be performed by a dropping manager as described with reference to FIGS. 4 through 7.

At 1215, the UE may apply the dropping rule to fewer than all spans within the slot. The operations of 1215 may be performed according to the methods described herein. In some examples, aspects of the operations of 1215 may be performed by a dropping manager as described with reference to FIGS. 4 through 7.

Figure 13:
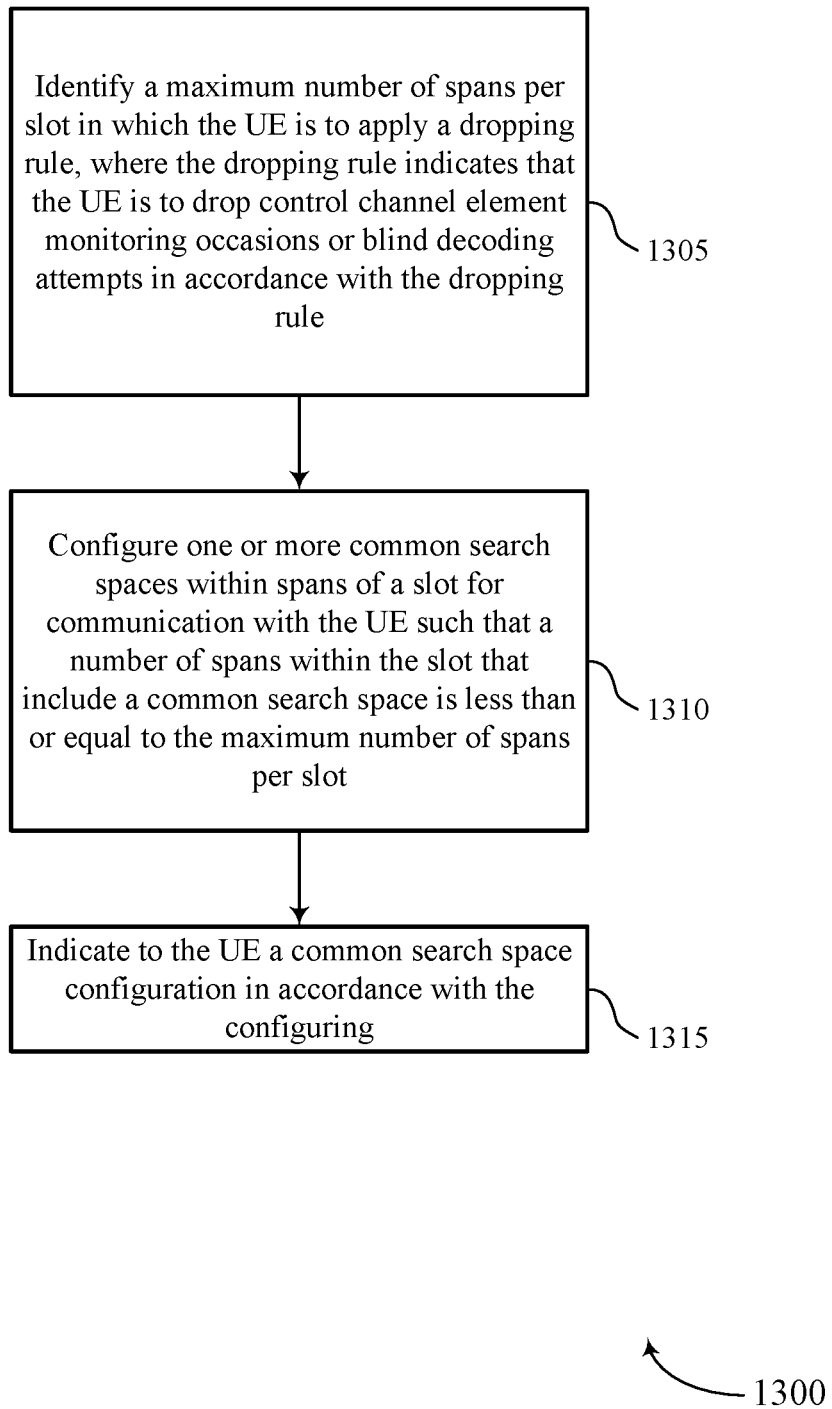

FIG. 13 shows a flowchart illustrating a method 1300 that supports relaxed CCE and blind decoding overbooking and dropping for NR URLLC in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described herein. Additionally, or alternatively, a base station may perform aspects of the functions described herein using special-purpose hardware.

At 1305, the base station may identify a maximum number of spans per slot in which a UE is to apply a dropping rule, where the dropping rule indicates that the UE is to drop control channel element monitoring occasions or blind decoding attempts in accordance with the dropping rule. Additionally or alternatively, at 1305, the base station may identify a fixed span within a slot in which the UE is to apply a dropping rule, where the dropping rule indicates that the UE is to drop control channel element monitoring occasions or blind decoding attempts in accordance with the dropping rule. The operations of 1305 may be performed according to the methods described herein. In some examples, aspects of the operations of 1305 may be performed by a UE capability manager as described with reference to FIGS. 8 through 11.

At 1310, the base station may configure one or more common search spaces within spans of a slot for communication with the UE such that a number of spans within the slot that include a common search space is less than or equal to the maximum number of spans per slot. Additionally or alternatively, at 1310, the base station may configure one or more common search spaces within spans of the slot for communication with the UE such that at least the fixed span within the slot includes a common search space. The operations of 1310 may be performed according to the methods described herein. In some examples, aspects of the operations of 1310 may be performed by a CSS manager as described with reference to FIGS. 8 through 11.

At 1315, the base station may indicate, to the UE, a common search space configuration in accordance with the configuring. The operations of 1315 may be performed according to the methods described herein. In some examples, aspects of the operations of 1315 may be performed by a UE configuration manager as described with reference to FIGS. 8 through 11.

The following provides an overview of aspects of the present disclosure:

Aspect 1: A method for wireless communications at a UE, comprising: determining that the UE is configured to use blind decoding for monitoring CCEs in a control resource set in accordance with at least one of a maximum number of blind decoding attempts per span within a slot or a maximum number of non-overlapping CCEs per span within the slot; identifying a dropping rule for the UE to drop CCE monitoring occasions or blind decoding attempts in excess of the maximum number of non-overlapping CCEs per span or the maximum number of blind decoding attempts per span, respectively; and applying the dropping rule to fewer than all spans within the slot.

Aspect 2: The method of aspect 1, further comprising: determining a fixed span within the slot in which the UE is to apply the dropping rule, wherein applying the dropping rule to fewer than all of the spans within the slot comprises: dropping one or more CCE monitoring occasions or one or more blind decoding attempts for the fixed span.

Aspect 3: The method of aspect 2, wherein the fixed span includes a first temporal span within the slot.

Aspect 4: The method of any of aspects 2 through 3, wherein the fixed span includes a span in which a CSS is present.

Aspect 5: The method of any of aspects 1 through 4, further comprising: determining a maximum number of spans in which the UE is to apply the dropping rule, wherein applying the dropping rule to fewer than all of the spans within the slot is based at least in part on the maximum number of spans determined by the UE.

Aspect 6: The method of aspect 5, wherein the maximum number of spans is common for different span timing and length configurations for the UE.

Aspect 7: The method of any of aspects 5 through 6, wherein the maximum number of spans is based at least in part on a UE capability, the method further comprising: transmitting the UE capability to a base station; and identifying that a number of spans that include a CSS within the slot is in accordance with the UE capability.

Aspect 8: The method of aspect 5, wherein the maximum number of spans is different for different span timing and length configurations for the UE.

Aspect 9: The method of any of aspects 5 through 8, wherein determining the maximum number of spans comprises: determining the maximum number of spans in which the UE is able to apply the dropping rule based at least in part on a PDSCH or PUSCH minimum processing time capability of a cell with which the UE communicates over the slot.

Aspect 10: The method of any of aspects 1 through 9, wherein applying the dropping rule to fewer than all of the spans within the slot comprises: dropping one or more CCE monitoring occasions or one or more blind decoding attempts for only a number of spans in which a CSS is present.

Aspect 11: The method of any of aspects 1 through 9, wherein applying the dropping rule to fewer than all of the spans within the slot comprises: dropping one or more CCE monitoring occasions or one or more blind decoding attempts for a number of spans in which a CSS is present and when the slot is for communications with either a Pcell or a PScell.

Aspect 12: The method of any of aspects 1 through 11, wherein applying the dropping rule to fewer than all of the spans within the slot comprises: refraining from applying the dropping rule in a number of spans that do not include a CSS.

Aspect 13: The method of any of aspects 1 through 12, wherein applying the dropping rule to fewer than all of the spans within the slot comprises: refraining from applying the dropping rule to any span within the slot based on the slot not including a CSS.

Aspect 14: A method for wireless communications at a base station, comprising: identifying a fixed span within a slot in which a UE is to apply a dropping rule, wherein the dropping rule indicates that the UE is to drop CCE monitoring occasions or blind decoding attempts in accordance with the dropping rule; configuring one or more CSSs within spans of the slot for communication with the UE such that at least the fixed span within the slot includes a CSS; and indicating, to the UE, a CSS configuration in accordance with the configuring.

Aspect 15: The method of aspect 14, wherein the fixed span is a first temporal span within the slot.

Aspect 16: The method of any of aspects 14 through 15, wherein the CSS is an only CSS configured within the spans of the slot for communication with the UE.

Aspect 17: A method for wireless communications at a base station, comprising: identifying a maximum number of spans per slot in which a UE is to apply a dropping rule, wherein the dropping rule indicates that the UE is to drop CCE monitoring occasions or blind decoding attempts in accordance with the dropping rule; configuring one or more CSSs within spans of a slot for communication with the UE such that a number of spans within the slot that include a CSS is less than or equal to the maximum number of spans per slot; and indicating, to the UE, a CSS configuration in accordance with the configuring.

Aspect 18: The method of aspect 17, wherein the maximum number of spans per slot is common for different span timing and length configurations for the UE.

Aspect 19: The method of aspect 17, wherein the maximum number of spans per slot is different for different span timing and length configurations for the UE.

Aspect 20: The method of any of aspects 17 through 19, wherein the maximum number of spans is based at least in part on a PDSCH or PUSCH minimum processing time capability of a cell associated with the base station and with which the UE communicates over the slot.

Aspect 21: An apparatus for wireless communications at a UE, comprising a processor; memory coupled with the processor; and instructions stored in the memory and executable by the processor to cause the apparatus to perform a method of any of aspects 1 through 13.

Aspect 22: An apparatus for wireless communications at a UE, comprising at least one means for performing a method of any of aspects 1 through 13.

Aspect 23: A non-transitory computer-readable medium storing code for wireless communications at a UE, the code comprising instructions executable by a processor to perform a method of any of aspects 1 through 13.

Aspect 24: An apparatus for wireless communications at a base station, comprising a processor; memory coupled with the processor; and instructions stored in the memory and executable by the processor to cause the apparatus to perform a method of any of aspects 14 through 16.

Aspect 25: An apparatus for wireless communications at a base station, comprising at least one means for performing a method of any of aspects 14 through 16.

Aspect 26: A non-transitory computer-readable medium storing code for wireless communications at a base station, the code comprising instructions executable by a processor to perform a method of any of aspects 14 through 16.

Aspect 27: An apparatus for wireless communications at a base station, comprising a processor; memory coupled with the processor; and instructions stored in the memory and executable by the processor to cause the apparatus to perform a method of any of aspects 17 through 20.

Aspect 28: An apparatus for wireless communications at a base station, comprising at least one means for performing a method of any of aspects 17 through 20.

Aspect 29: A non-transitory computer-readable medium storing code for wireless communications at a base station, the code comprising instructions executable by a processor to perform a method of any of aspects 17 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

monitoring control channel elements in a control resource set in accordance with at least one of a maximum number of downlink control channel candidates per span within a slot or a maximum number of non-overlapping control channel elements per span within the slot;

identifying a dropping rule for the UE to drop control channel element monitoring occasions or downlink control channel candidates in excess of the maximum number of non-overlapping control channel elements per span or the maximum number of downlink control channel candidates per span, respectively; and applying the dropping rule to a fixed span within the slot.

2. The method of claim 1, further comprising:
determining the fixed span within the slot in which the UE is to apply the dropping rule, wherein applying the dropping rule to the fixed span within the slot comprises:
dropping one or more control channel element monitoring occasions or one or more downlink control channel candidates for the fixed span.

3. The method of claim 2, wherein the fixed span includes a first temporal span within the slot.

4. The method of claim 2, wherein the fixed span includes a span in which a common search space is present.

5. The method of claim 1, further comprising:
determining a maximum number of spans in which the UE is to apply the dropping rule, wherein applying the dropping rule to the fixed span within the slot is based at least in part on the maximum number of spans determined by the UE.

6. The method of claim 5, wherein the maximum number of spans is common for different span timing and length configurations for the UE.

7. The method of claim 5, wherein the maximum number of spans is based at least in part on a UE capability, the method further comprising:
transmitting the UE capability to a network device; and
identifying that a number of spans that include a common search space within the slot is in accordance with the UE capability.

8. The method of claim 5, wherein the maximum number of spans is different for different span timing and length configurations for the UE.

9. The method of claim 5, wherein determining the maximum number of spans comprises:
determining the maximum number of spans in which the UE is able to apply the dropping rule based at least in part on a physical downlink shared channel (PDSCH) or physical uplink shared channel (PUSCH) minimum processing time capability of a cell with which the UE communicates over the slot.

10. The method of claim 1, wherein applying the dropping rule to the fixed span within the slot comprises:
dropping one or more control channel element monitoring occasions or one or more downlink control channel candidates for only a number of spans in which a common search space is present.

11. The method of claim 1, wherein applying the dropping rule to the fixed span within the slot comprises:
dropping one or more control channel element monitoring occasions or one or more downlink control channel candidates for a number of spans in which a common search space is present and when the slot is for communications with either a primary cell or a primary-secondary cell.

12. The method of claim 1, wherein applying the dropping rule to the fixed span within the slot comprises:
refraining from applying the dropping rule in a number of spans that do not include a common search space.

13. The method of claim 1, wherein applying the dropping rule to the fixed span within the slot comprises:
refraining from applying the dropping rule to any span within the slot based on the slot not including a common search space.

14. A method for wireless communications at a network device, comprising:
identifying a fixed span within a slot in which a user equipment (UE) is to apply a dropping rule, wherein the dropping rule indicates that the UE is to drop control channel element monitoring occasions or downlink control channel candidates in accordance with the dropping rule;
configuring one or more common search spaces within spans of the slot for communication with the UE such that at least the fixed span within the slot includes a common search space; and
indicating, to the UE, a common search space configuration in accordance with the configuring.

15. The method of claim 14, wherein the fixed span is a first temporal span within the slot.

16. The method of claim 14, wherein the common search space is an only common search space configured within the spans of the slot for communication with the UE.

17. A method for wireless communications at a network device, comprising:
identifying a maximum number of spans per slot in which a user equipment (UE) is to apply a dropping rule, wherein the dropping rule indicates that the UE is to drop control channel element monitoring occasions or downlink control channel candidates in accordance with the dropping rule;
configuring one or more common search spaces within spans of a slot for communication with the UE such that a number of spans within the slot that include a common search space is less than or equal to the maximum number of spans per slot; and
indicating, to the UE, a common search space configuration in accordance with the configuring.

18. The method of claim 17, wherein the maximum number of spans per slot is common for different span timing and length configurations for the UE.

19. The method of claim 17, wherein the maximum number of spans per slot is different for different span timing and length configurations for the UE.

20. The method of claim 17, wherein the maximum number of spans is based at least in part on a physical downlink shared channel (PDSCH) or physical uplink shared channel (PUSCH) minimum processing time capability of a cell associated with the network device and with which the UE communicates over the slot.

21. An apparatus for wireless communications at a user equipment (UE), comprising:
a processor,
memory coupled with the processor; and
instructions stored in the memory and executable by the processor to cause the apparatus to:
monitor control channel elements in a control resource set in accordance with at least one of a maximum number of downlink control channel candidates per span within a slot or a maximum number of non-overlapping control channel elements per span within the slot;
identify a dropping rule for the UE to drop control channel element monitoring occasions or downlink control channel candidates in excess of the maximum number of non-overlapping control channel elements per span or the maximum number of downlink control channel candidates per span, respectively; and
apply the dropping rule to a fixed span within the slot.

22. The apparatus of claim 21, wherein the instructions are further executable by the processor to cause the apparatus to:
determine the fixed span within the slot in which the UE is to apply the dropping rule, wherein the instructions to apply the dropping rule to the fixed span within the slot are executable by the processor to cause the apparatus to:

drop one or more control channel element monitoring occasions or one or more downlink control channel candidates for the fixed span.

23. The apparatus of claim 22, wherein the fixed span includes a first temporal span within the slot.

24. The apparatus of claim 22, wherein the fixed span includes a span in which a common search space is present.

25. The apparatus of claim 21, wherein the instructions are further executable by the processor to cause the apparatus to:

determine a maximum number of spans in which the UE is to apply the dropping rule, wherein applying the dropping rule to the fixed span within the slot is based at least in part on the maximum number of spans.

26. The apparatus of claim 25, wherein the maximum number of spans is common for different span timing and length configurations for the UE.

27. The apparatus of claim 25, wherein the maximum number of spans is based at least in part on a UE capability, and wherein the instructions are further executable by the processor to cause the apparatus to:

transmit the UE capability to a network device; and
identify that a number of spans that include a common search space within the slot is in accordance with the UE capability.

28. The apparatus of claim 25, wherein the maximum number of spans is different for different span timing and length configurations for the UE.

29. The apparatus of claim 25, wherein the instructions to determine the maximum number of spans are executable by the processor to cause the apparatus to:

determine the maximum number of spans in which the UE is able to apply the dropping rule based at least in part on a physical downlink shared channel (PDSCH) or physical uplink shared channel (PUSCH) minimum processing time capability of a cell with which the UE communicates over the slot.

30. The apparatus of claim 21, wherein the instructions to apply the dropping rule to the fixed span within the slot are executable by the processor to cause the apparatus to:

drop one or more control channel element monitoring occasions or one or more downlink control channel candidates for only a number of spans in which a common search space is present.

31. The apparatus of claim 21, wherein the instructions to apply the dropping rule to the fixed span within the slot are executable by the processor to cause the apparatus to:

drop one or more control channel element monitoring occasions or one or more downlink control channel candidates for a number of spans in which a common search space is present and when the slot is for communications with either a primary cell or a primary-secondary cell.

32. The apparatus of claim 21, wherein the instructions to apply the dropping rule to the fixed span within the slot are executable by the processor to cause the apparatus to:

refrain from applying the dropping rule in a number of spans that do not include a common search space.

33. The apparatus of claim 21, wherein the instructions to apply the dropping rule to the fixed span within the slot are executable by the processor to cause the apparatus to:

refrain from applying the dropping rule to any span within the slot based on the slot not including a common search space.

34. An apparatus for wireless communications at a network device, comprising:

a processor,
memory coupled with the processor; and
instructions stored in the memory and executable by the processor to cause the apparatus to:

identify a fixed span within a slot in which a user equipment (UE) is to apply a dropping rule, wherein the dropping rule indicates that the UE is to drop control channel element monitoring occasions or downlink control channel candidates in accordance with the dropping rule;

configure one or more common search spaces within spans of the slot for communication with the UE such that at least the fixed span within the slot includes a common search space; and indicate, to the UE, a common search space configuration in accordance with the configuring.

35. The apparatus of claim 34, wherein the fixed span is a first temporal span within the slot.

36. The apparatus of claim 34, wherein the common search space is an only common search space configured within the spans of the slot for communication with the UE.

37. An apparatus for wireless communications at a network device, comprising:

a processor,
memory coupled with the processor; and
instructions stored in the memory and executable by the processor to cause the apparatus to:

identify a maximum number of spans per slot in which a user equipment (UE) is to apply a dropping rule, wherein the dropping rule indicates that the UE is to drop control channel element monitoring occasions or downlink control channel candidates in accordance with the dropping rule;

configure one or more common search spaces within spans of a slot for communication with the UE such that a number of spans within the slot that include a common search space is less than or equal to the maximum number of spans per slot; and indicate, to the UE, a common search space configuration in accordance with the configuring.

38. The apparatus of claim 37, wherein the maximum number of spans is common for different span timing and length configurations for the UE.

39. The apparatus of claim 37, wherein the maximum number of spans is different for different span timing and length configurations for the UE.

40. The apparatus of claim 37, wherein the maximum number of spans is based at least in part on a physical downlink shared channel (PDSCH) or physical uplink shared channel (PUSCH) minimum processing time capability of a cell associated with the network device and with which the UE communicates over the slot.

41. An apparatus for wireless communications at a user equipment (UE), comprising:

means for monitoring control channel elements in a control resource set in accordance with at least one of a maximum number of downlink control channel candidates per span within a slot or a maximum number of non-overlapping control channel elements per span within the slot;

means for identifying a dropping rule for the UE to drop control channel element monitoring occasions or downlink control channel candidates in excess of the maximum number of non-overlapping control channel elements per span or the maximum number of downlink control channel candidates per span, respectively; and means for applying the dropping rule to a fixed span within the slot.

42. An apparatus for wireless communications at a network device, comprising:
    means for identifying a fixed span within a slot in which a user equipment (UE) is to apply a dropping rule, wherein the dropping rule indicates that the UE is to drop control channel element monitoring occasions or downlink control channel candidates in accordance with the dropping rule;
    means for configuring one or more common search spaces within spans of the slot for communication with the UE such that at least the fixed span within the slot includes a common search space; and
    means for indicating, to the UE, a common search space configuration in accordance with the configuring.

43. An apparatus for wireless communications at a network device, comprising:
    means for identifying a maximum number of spans per slot in which a user equipment (UE) is to apply a dropping rule, wherein the dropping rule indicates that the UE is to drop control channel element monitoring occasions or downlink control channel candidates in accordance with the dropping rule;
    means for configuring one or more common search spaces within spans of a slot for communication with the UE such that a number of spans within the slot that include a common search space is less than or equal to the maximum number of spans per slot; and
    means for indicating, to the UE, a common search space configuration in accordance with the configuring.

44. A non-transitory computer-readable medium storing code for wireless communications at a user equipment (UE), the code comprising instructions executable by a processor to:
    monitor control channel elements in a control resource set in accordance with at least one of a maximum number of downlink control channel candidates per span within a slot or a maximum number of non-overlapping control channel elements per span within the slot;
    identify a dropping rule for the UE to drop control channel element monitoring occasions or downlink control channel candidates in excess of the maximum number of non-overlapping control channel elements per span or the maximum number of downlink control channel candidates per span, respectively; and
    apply the dropping rule to a fixed span within the slot.

45. A non-transitory computer-readable medium storing code for wireless communications at a network device, the code comprising instructions executable by a processor to:
    identify a fixed span within a slot in which a user equipment (UE) is to apply a dropping rule, wherein the dropping rule indicates that the UE is to drop control channel element monitoring occasions or downlink control channel candidates in accordance with the dropping rule;
    configure one or more common search spaces within spans of the slot for communication with the UE such that at least the fixed span within the slot includes a common search space; and
    indicate, to the UE, a common search space configuration in accordance with the configuring.

46. A non-transitory computer-readable medium storing code for wireless communications at a network device, the code comprising instructions executable by a processor to:
    identify a maximum number of spans per slot in which a user equipment (UE) is to apply a dropping rule, wherein the dropping rule indicates that the UE is to drop control channel element monitoring occasions or downlink control channel candidates in accordance with the dropping rule;
    configure one or more common search spaces within spans of a slot for communication with the UE such that a number of spans within the slot that include a common search space is less than or equal to the maximum number of spans per slot; and
    indicate, to the UE, a common search space configuration in accordance with the configuring.

* * * * *